(12) United States Patent
Xue et al.

(10) Patent No.: US 10,608,796 B2
(45) Date of Patent: Mar. 31, 2020

(54) RESOURCE MAPPING FOR A USER EQUIPMENT IN A COMMUNICATION SYSTEM

(71) Applicant: HUAWEI TECHNOLOGIES CO., LTD., Shenzhen, Guangdong (CN)

(72) Inventors: Lixia Xue, Beijing (CN); Jingyuan Sun, Shenzhen (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 15/824,923

(22) Filed: Nov. 28, 2017

(65) Prior Publication Data
US 2018/0083755 A1    Mar. 22, 2018

Related U.S. Application Data

(63) Continuation of application No. PCT/CN2015/080412, filed on May 29, 2015.

(51) Int. Cl.
*H04W 72/04* (2009.01)
*H04L 5/00* (2006.01)
(Continued)

(52) U.S. Cl.
CPC .......... *H04L 5/0048* (2013.01); *H04L 1/1607* (2013.01); *H04L 5/0044* (2013.01);
(Continued)

(58) Field of Classification Search
CPC ............................ H04W 72/04; H04L 5/0048
See application file for complete search history.

(56) References Cited

U.S. PATENT DOCUMENTS

2009/0046793 A1    2/2009 Love et al.
2010/0002804 A1    1/2010 Ogawa et al.
(Continued)

FOREIGN PATENT DOCUMENTS

CN    102547872 A    7/2012
CN    103428859 A    12/2013
(Continued)

OTHER PUBLICATIONS

3GPP TS 36.213 v10.12.0, 3rd Generation Partnership Project, Technical Specification Group Radio Access Network, Evolved Universal Terrestrial Radio Access (E-UTRA), Physical layer procedures (Release 10), Mar. 2014, 127 pages. (Year: 2014).*
(Continued)

*Primary Examiner* — Hoon J Chung
(74) *Attorney, Agent, or Firm* — Fish & Richardson P.C.

(57) ABSTRACT

A resource mapping method and an apparatus are provided relating to the communications field, the solutions capable of flexibly implementing resource mapping of a channel or a signal. In one example implementation, first information is obtained that is used to indicate a cyclic shift start resource block location or a cyclic shift end resource block location for resource mapping of a first channel or a first signal in a resource block cyclic shift manner in a bandwidth used by user equipment. A resource mapping location of the first channel or the first signal in the bandwidth used by the user equipment is determined according to the resource block cyclic shift manner and the first information. The first channel or the first signal is received or sent at the resource mapping location. The resource mapping method and the apparatus are used to map a resource.

21 Claims, 18 Drawing Sheets

(51) Int. Cl.
*H04L 1/16* (2006.01)
*H04W 28/06* (2009.01)
*H04L 1/18* (2006.01)

(52) U.S. Cl.
CPC .......... *H04L 5/0053* (2013.01); *H04L 5/0092* (2013.01); *H04W 28/06* (2013.01); *H04W 72/04* (2013.01); *H04L 1/1887* (2013.01); *H04W 72/0446* (2013.01)

(56) References Cited

U.S. PATENT DOCUMENTS

| | | | |
|---|---|---|---|
| 2011/0081933 A1* | 4/2011 | Suh | G01S 5/0236 455/509 |
| 2013/0072242 A1 | 3/2013 | Iwai et al. | |
| 2013/0114570 A1 | 5/2013 | Park et al. | |
| 2013/0155987 A1 | 6/2013 | Lan et al. | |
| 2014/0126506 A1 | 5/2014 | Horiuchi et al. | |
| 2015/0359003 A1* | 12/2015 | Kim | H04W 74/0891 370/336 |

FOREIGN PATENT DOCUMENTS

| | | |
|---|---|---|
| JP | 2013539274 A | 10/2013 |
| RU | 2452108 C2 | 5/2012 |
| WO | 2007098641 A1 | 9/2007 |
| WO | 2009057039 A2 | 5/2009 |
| WO | 2011083769 A1 | 7/2011 |
| WO | 2013107259 A1 | 7/2013 |
| WO | 2013170699 A1 | 11/2013 |

OTHER PUBLICATIONS

International Search Report in International Application No. PCT/CN2015/080412, dated Mar. 1, 2016, 6 pages.
Japanese Office Action issued in Japanese Application No. 2017-561863 dated Dec. 17, 2018, 4 pages.
Extended European Search Report issued in European Application No. 15893646.8 dated Apr. 4, 2018, 8 pages.
Office Action issued in Russian Application No. 2017146125/07(078888) dated May 7, 2018, 6 pages.
Search Report issued in Russian Application No. 2017146125/07(078888), actual completion of the search, dated Apr. 17, 2018, 4 pages.

* cited by examiner

RESOURCE MAPPING FOR A USER EQUIPMENT IN A COMMUNICATION SYSTEM

CROSS-REFERENCE TO RELATED APPLICATIONS

This application is a continuation of International Application No. PCT/CN2015/080412, filed on May 29, 2015, the disclosure of which is hereby incorporated by reference in its entirety.

TECHNICAL FIELD

The present invention relates to the communications field, and in particular, to a resource mapping method and an apparatus.

BACKGROUND

Currently, a Long Term Evolution (LTE) system is provided with six standardized LTE system bandwidths, that is, 1.4 megahertz (MHz), 3 MHz, 5 MHz, 10 MHz, 15 MHz, and 20 MHz. In LTE, user equipment can support 20 MHz. As an actual value of a system bandwidth of a base station changes, the user equipment may absolutely match the system bandwidth of the base station. For example, if the system bandwidth of the base station is 10 MHz, a bandwidth used by the user equipment may be 10 MHz.

When transmitting a channel or a signal to the user equipment, the base station needs to map the channel or the signal to the system bandwidth of the base station, that is, to the bandwidth used by the user equipment, due to a reason that in the LTE system, the system bandwidth of the base station is the same as the bandwidth used by the user equipment. For example, a resource of an uplink/downlink control channel and a resource of a reference signal are separately mapped to the entire system bandwidth of the base station. The control channel may be one or more of a physical control format indicator channel (PCFICH), a physical downlink control channel (PDCCH), a physical hybrid ARQ indicator channel (PHICH), a physical uplink control channel (PUCCH), or a physical random access channel (PRACH). The reference signal may be one or more of a cell-specific reference signal (CRS) or a channel state information-reference signal (CSI-RS). Resources of some channels or signals are dynamically mapped to a designated location of the entire system bandwidth of the base station. The some channels or signals may be one or more of a configured system information block (SIB), a configured random access response (RAR), a configured paging message, or a configured physical downlink shared channel (PDSCH). Resources of other channels or signals are mapped to predefined time-frequency resources of the system bandwidth of the base station. The other channels or signals may be one or more of a primary synchronization signal PSS), a secondary synchronization signal (SSS), or a physical broadcast channel (PBCH).

However, because of spectrum resource division, replanning and redeployment of another system resource, or the like, in an LTE system deployment process, a bandwidth different from the six standardized LTE system bandwidths may be encountered, such as 6 MHz, 6.2 MHz, 6.5 MHz, 7 MHz, 11 MHz, 12 MHz, and 13 MHz. To reduce impact on the user equipment and standardize a bandwidth as far as possible, to adapt to network access capabilities of various user equipments, and to improve utilization of a system resource, a case in which the system bandwidth of the base station does not match the bandwidth of the user equipment potentially exists in the future. For example, the system bandwidth of the base station is 6 MHz, and the bandwidth used by the user equipment is 5 MHz. In this case, in a resource mapping process of the channel or the signal, if determining of an available resource and resource mapping are still performed in ascending order of frequency domains of all physical resource blocks (PRB) in the system bandwidth of the base station, because of a limited bandwidth used by specific user equipment, the user equipment cannot use a resource block beyond a capability of the user equipment or a resource block corresponding to addressing. Therefore, this inflexible resource mapping of the channel or the signal affects normal communication between the base station and the user equipment.

SUMMARY

Embodiments of the present invention provide a resource mapping method and an apparatus, so as to flexibly implement resource mapping of a channel or a signal.

To achieve the foregoing objective, the following technical solutions are used in the embodiments of the present invention.

According to a first aspect, a resource mapping method is provided, where the method is applied to user equipment and includes:

obtaining first information, where the first information is used to indicate a cyclic shift start resource block location or a cyclic shift end resource block location for resource mapping of a first channel or a first signal in a resource block cyclic shift manner in a bandwidth used by the user equipment;

determining, according to the resource block cyclic shift manner and the first information, a resource mapping location of the first channel or the first signal in the bandwidth used by the user equipment; and receiving or sending the first channel or the first signal at the resource mapping location.

With reference to the first aspect, in a first implementable manner, the determining, according to the resource block cyclic shift manner and the first information, a resource mapping location of the first channel or the first signal in the bandwidth used by the user equipment includes:

determining a resource block cyclic shift deviation value according to the first information, and determining, in the resource block cyclic shift manner according to the deviation value, the resource mapping location of the first channel or the first signal in the bandwidth used by the user equipment, where the resource block cyclic shift deviation value is a value of a deviation between the cyclic shift start resource block location for resource mapping corresponding to the first information and a start resource block location in the bandwidth used by the user equipment; or the resource block cyclic shift deviation value is a value of a deviation between the cyclic shift end resource block location for resource mapping corresponding to the first information and an end resource block location in the bandwidth used by the user equipment.

With reference to the first aspect or the first implementable manner, in a second implementable manner, the determining, according to the resource block cyclic shift manner and the first information, a resource mapping location of the first channel or the first signal in the bandwidth used by the user equipment further includes:

determining, according to the cyclic shift start resource block location or the cyclic shift end resource block location indicated by the first information and the resource block cyclic shift deviation value corresponding to the first channel or the first signal, a resource mapping start location or end location of the first channel or the first signal in the bandwidth used by the user equipment; and determining, according to the resource block cyclic shift manner, all resource mapping locations for resource mapping of the first channel or the first signal in the bandwidth used by the user equipment.

With reference to any one of the first aspect, or the first or the second implementable manner, in a third implementable manner, the first channel is one or more of a physical control format indicator channel PCFICH, a physical downlink control channel PDCCH, an enhanced physical downlink control channel EPDCCH, a physical hybrid ARQ indicator channel PHICH, a physical broadcast channel PBCH, a physical uplink control channel PUCCH, or a physical random access channel PRACH; and the first signal is one or more of a reference signal, a primary synchronization signal PSS, or a secondary synchronization signal SSS, where the reference signal includes one or more of a cell-specific reference signal CRS, a channel state information-reference signal CSI-RS, a positioning reference signal PRS, a discovery reference signal DRS, or a sounding reference signal SRS.

With reference to any one of the first aspect, or the first to the third implementable manners, in a fourth implementable manner, different types of first channels and/or different types of first signals have a same cyclic shift start resource block location for resource mapping; and/or different types of first channels and/or different types of first signals have a same cyclic shift end resource block location for resource mapping; and/or different types of first channels and/or different types of first signals have a same cyclic shift deviation value for resource mapping; and/or cyclic shift deviation values or a cyclic shift deviation value for resource mapping of an uplink first channel and/or an uplink first signal are/is different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal are/is different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal are/is different from cyclic shift deviation values or a cyclic shift deviation value for resource mapping of the downlink first channel and/or the downlink first signal.

With reference to any one of the first aspect, or the first to the fourth implementable manners, in a fifth implementable manner, the obtaining first information includes:

blindly detecting a second signal, and determining the first information according to a start location or an end location of the second signal in the bandwidth used by the user equipment, where the start location or the end location of the second signal in the bandwidth used by the user equipment is a start location or an end location of a bandwidth corresponding to a sequence of the second signal, a size of the bandwidth corresponding to the sequence of the second signal is predefined or is notified by a base station or blindly detected, and the bandwidth corresponding to the sequence of the second signal is a transmission bandwidth or a carrier bandwidth of the second signal.

With reference to the fifth implementable manner, in a sixth implementable manner, the second signal is one or more of a reference signal, a primary synchronization signal PSS, or a secondary synchronization signal SSS, the reference signal includes one or more of a cell-specific reference signal CRS or a CSI-RS, the start location or the end location of the second signal in the bandwidth used by the user equipment includes a boundary at which the bandwidth used by the user equipment overlaps the carrier bandwidth of the second signal, and the second signal is a signal or a channel used to determine the boundary.

With reference to any one of the first aspect, or the first to the fourth implementable manners, in a seventh implementable manner, the obtaining first information includes:

receiving the first information sent by a base station.

With reference to any one of the first aspect, or the first to the seventh implementable manners, in an eighth implementable manner, the determining, according to the resource block cyclic shift manner and the first information, a resource mapping location of the first channel or the first signal in the bandwidth used by the user equipment includes:

a resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

With reference to any one of the first aspect, or the first to the eighth implementable manners, in a ninth implementable manner, the method further includes:

using, as a start location or an end location for numbering resource blocks in the bandwidth used by the user equipment, the location indicated by the first information, and numbering, according to the resource block cyclic shift manner or according to a resource block consecutive numbering manner, the resource blocks in the bandwidth used by the user equipment; or using, as a start location for numbering resource blocks, a start location in the bandwidth used by the user equipment, to consecutively number the resource blocks; or using, as an end location for numbering resource blocks, an end location in the bandwidth used by the user equipment, to consecutively number the resource blocks.

With reference to the ninth implementable manner, in a tenth implementable manner, the numbering, according to the resource block cyclic shift manner or according to a resource block consecutive numbering manner, the resource blocks in the bandwidth used by the user equipment includes:

a maximum number of the resource blocks is greater than a quantity of resource blocks included in the bandwidth used by the user equipment; and/or a minimum number of the resource blocks is L, where L is a positive integer greater than or equal to 1.

With reference to the tenth implementable manner, in an eleventh implementable manner, the maximum number of the resource blocks is configured by higher layer signaling.

With reference to the tenth implementable manner, in a twelfth implementable manner, the minimum number of the resource blocks is configured by higher layer signaling.

With reference to any one of the tenth to the twelfth implementable manners, in a thirteenth implementable manner, numbers of the resource blocks of the user equipment are the same as numbers of corresponding resource blocks of a first base station, and the first base station is a base station that communicates with the user equipment.

With reference to any one of the first aspect, or the first to the thirteenth implementable manners, in a fourteenth implementable manner, the bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth used by the user equipment and the non-overlapping bandwidth in the second bandwidth have a same size.

According to a second aspect, a resource mapping method is provided, where the method is applied to a base station and includes:

determining first information, where the first information is used to indicate a cyclic shift start resource block location or a cyclic shift end resource block location for resource mapping of a first channel or a first signal in a resource block cyclic shift manner in a bandwidth used by user equipment;

determining, according to the resource block cyclic shift manner and the first information, a resource mapping location of the first channel or the first signal in the bandwidth used by the user equipment; and receiving or sending the first channel or the first signal at the resource mapping location.

With reference to the second aspect, in a first implementable manner, the determining, according to the resource block cyclic shift manner and the first information, a resource mapping location of the first channel or the first signal in the bandwidth used by the user equipment includes:

determining a resource block cyclic shift deviation value according to the first information, and determining, in the resource block cyclic shift manner according to the deviation value, the resource mapping location of the first channel or the first signal in the bandwidth used by the user equipment, where the resource block cyclic shift deviation value is a value of a deviation between the cyclic shift start resource block location for resource mapping corresponding to the first information and a start resource block location in the bandwidth used by the user equipment; or the resource block cyclic shift deviation value is a value of a deviation between the cyclic shift end resource block location for resource mapping corresponding to the first information and an end resource block location in the bandwidth used by the user equipment.

With reference to the second aspect or the first implementable manner, in a second implementable manner, the determining, according to the resource block cyclic shift manner and the first information, a resource mapping location of the first channel or the first signal in the bandwidth used by the user equipment further includes:

determining, according to the cyclic shift start resource block location or the cyclic shift end resource block location indicated by the first information and the resource block cyclic shift deviation value corresponding to the first channel or the first signal, a resource mapping start location or end location of the first channel or the first signal in the bandwidth used by the user equipment; and determining, according to the resource block cyclic shift manner, all resource mapping locations for resource mapping of the first channel or the first signal in the bandwidth used by the user equipment.

With reference to any one of the second aspect, or the first or the second implementable manner, in a third implementable manner, the first channel is one or more of a physical control format indicator channel PCFICH, a physical downlink control channel PDCCH, an enhanced physical downlink control channel EPDCCH, a physical hybrid ARQ indicator channel PHICH, a physical broadcast channel PBCH, a physical uplink control channel PUCCH, or a physical random access channel PRACH; and the first signal is one or more of a reference signal, a primary synchronization signal PSS, or a secondary synchronization signal SSS, where the reference signal includes one or more of a cell-specific reference signal CRS, a channel state information-reference signal CSI-RS, a positioning reference signal PRS, a discovery reference signal DRS, or a sounding reference signal SRS.

With reference to any one of the second aspect, or the first to the third implementable manners, in a fourth implementable manner, different types of first channels and/or different first signals have a same cyclic shift start resource block location for resource mapping; and/or different types of first channels and/or different first signals have a same cyclic shift end resource block location for resource mapping; and/or different types of first channels and/or different first signals have a same cyclic shift deviation value for resource mapping; and/or cyclic shift deviation values or a cyclic shift deviation value for resource mapping of an uplink first channel and/or an uplink first signal are/is different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal are/is different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal are/is different from cyclic shift deviation values or a cyclic shift deviation value for resource mapping of the downlink first channel and/or the downlink first signal.

With reference to any one of the second aspect, or the first to the fourth implementable manners, in a fifth implementable manner, the method further includes:

sending a second signal, and determining the first information according to a start location or an end location of the second signal in the bandwidth used by the user equipment, where the start location or the end location of the second signal in the bandwidth used by the user equipment is a start location or an end location of a bandwidth corresponding to a sequence of the second signal, a size of the bandwidth corresponding to the sequence of the second signal is predefined or is notified by the base station or blindly detected, and the bandwidth corresponding to the sequence of the second signal is a transmission bandwidth or a carrier bandwidth of the second signal.

With reference to the fifth implementable manner, in a sixth implementable manner, the second signal is one or more of a reference signal, a primary synchronization signal PSS, or a secondary synchronization signal SSS, the reference signal includes one or more of a cell-specific reference signal CRS or a CSI-RS, the start location or the end location of the second signal in the bandwidth used by the user equipment includes a boundary at which the bandwidth used by the user equipment overlaps the carrier bandwidth of the second signal, and the second signal is a signal or a channel used to determine the boundary.

With reference to any one of the second aspect, or the first to the sixth implementable manners, in a seventh implementable manner, the method further includes:

sending the first information.

With reference to any one of the second aspect, or the first to the seventh implementable manners, in an eighth implementable manner, the determining, according to the resource block cyclic shift manner and the first information, a resource mapping location of the first channel or the first signal in the bandwidth used by the user equipment includes:

a resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

With reference to any one of the second aspect, or the first to the eighth implementable manners, in a ninth implementable manner, the method further includes:

using, as a start location or an end location for numbering resource blocks in the bandwidth used by the user equipment, the location indicated by the first information, and numbering, according to the resource block cyclic shift manner or according to a resource block consecutive numbering manner, the resource blocks in the bandwidth used by the user equipment; or using, as a start location for numbering resource blocks, a start location in the bandwidth used by the user equipment, to consecutively number the resource blocks; or using, as an end location for numbering resource blocks, an end location in the bandwidth used by the user equipment, to consecutively number the resource blocks.

With reference to the ninth implementable manner, in a tenth implementable manner, the numbering, according to the resource block cyclic shift manner or according to a resource block consecutive numbering manner, the resource blocks in the bandwidth used by the user equipment includes:

a maximum number of the resource blocks is greater than a quantity of resource blocks included in the bandwidth used by the user equipment; and/or a minimum number of the resource blocks is L, where L is a positive integer greater than or equal to 1.

With reference to the tenth implementable manner, in an eleventh implementable manner, the method further includes:

sending higher layer signaling to the user equipment, where the higher layer signaling is used to configure the maximum number of the resource blocks.

With reference to the tenth implementable manner, in a twelfth implementable manner, the method further includes:

sending higher layer signaling to the user equipment, where the higher layer signaling is used to configure the minimum number of the resource blocks.

With reference to any one of the tenth to the twelfth implementable manners, in a thirteenth implementable manner, in the bandwidth used by the user equipment, numbers of the resource blocks of the user equipment are the same as numbers of corresponding resource blocks of the base station.

With reference to any one of the second aspect, or the first to the thirteenth implementable manners, in a fourteenth implementable manner, the bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth of the user equipment and the non-overlapping bandwidth in the second bandwidth have a same size.

With reference to any one of the second aspect, or the first to the thirteenth implementable manners, in a fifteenth implementable manner, a bandwidth used by the base station includes bandwidths used by at least two user equipments, the bandwidths used by the two user equipments have an overlapping part, and a same resource block for the two user equipments has a same resource block number on the overlapping part; or resource blocks in total bandwidths used by the two user equipments are consecutively numbered; or resource blocks in total bandwidths used by the two user equipments are numbered in a cyclic shift manner, where a maximum number is greater than or equal to a total quantity of the resource blocks in the total bandwidths used by the two user equipments, or/and a minimum number is 0 or 1 or L, where L is a positive integer greater than 1; or a bandwidth used by the base station includes bandwidths used by at least two user equipments, the bandwidth used by the two user equipments have an overlapping part, the base station maps first channels or first signals of the two user equipments to the overlapping part, and parts of the first channels or the first signals of the two user equipments in the overlapping area are the same or different.

According to a third aspect, user equipment is provided and includes:

an obtaining unit, configured to obtain first information, where the first information is used to indicate a cyclic shift start resource block location or a cyclic shift end resource block location for resource mapping of a first channel or a first signal in a resource block cyclic shift manner in a bandwidth used by the user equipment;

a processing unit, configured to determine, according to the resource block cyclic shift manner and the first information, a resource mapping location of the first channel or the first signal in the bandwidth used by the user equipment;

a receiving unit, configured to receive the first channel or the first signal at the resource mapping location; and a sending unit, configured to send the first channel or the first signal at the resource mapping location.

With reference to the third aspect, in a first implementable manner, the processing unit is specifically configured to:

determine a resource block cyclic shift deviation value according to the first information, and determine, in the resource block cyclic shift manner according to the deviation value, the resource mapping location of the first channel or the first signal in the bandwidth used by the user equipment, where the resource block cyclic shift deviation value is a value of a deviation between the cyclic shift start resource block location for resource mapping corresponding to the first information and a start resource block location in the bandwidth used by the user equipment; or the resource block cyclic shift deviation value is a value of a deviation between the cyclic shift end resource block location for resource mapping corresponding to the first information and an end resource block location in the bandwidth used by the user equipment.

With reference to the third aspect or the first implementable manner, in a second implementable manner, the processing unit is specifically configured to:

determine, according to the cyclic shift start resource block location or the cyclic shift end resource block location indicated by the first information and the resource block cyclic shift deviation value corresponding to the first channel or the first signal, a resource mapping start location or end location of the first channel or the first signal in the bandwidth used by the user equipment; and determine, according to the resource block cyclic shift manner, all resource mapping locations for resource mapping of the first channel or the first signal in the bandwidth used by the user equipment.

With reference to any one of the third aspect, or the first or the second implementable manner, in a third implementable manner, the first channel is one or more of a physical control format indicator channel PCFICH, a physical downlink control channel PDCCH, an enhanced physical downlink control channel EPDCCH, a physical hybrid ARQ indicator channel PHICH, a physical broadcast channel PBCH, a physical uplink control channel PUCCH, or a physical random access channel PRACH; and the first signal is one or more of a reference signal, a primary synchronization signal PSS, or a secondary synchronization signal SSS, where the reference signal includes one or more of a cell-specific reference signal CRS, a channel state information-reference signal CSI-RS, a positioning reference signal PRS, a discovery reference signal DRS, or a sounding reference signal SRS.

With reference to any one of the third aspect, or the first to the third implementable manners, in a fourth implementable manner, different types of first channels and/or different types of first signals have a same cyclic shift start resource block location for resource mapping; and/or different types of first channels and/or different types of first signals have a same cyclic shift end resource block location for resource mapping; and/or different types of first channels and/or different types of first signals have a same cyclic shift deviation value for resource mapping; and/or cyclic shift deviation values or a cyclic shift deviation value for resource mapping of an uplink first channel and/or an uplink first signal are/is different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal are/is different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal are/is different from cyclic shift deviation values or a cyclic shift deviation value for resource mapping of the downlink first channel and/or the downlink first signal.

With reference to any one of the third aspect, or the first to the fourth implementable manners, in a fifth implementable manner, the obtaining unit is specifically configured to:

blindly detect a second signal, and determine the first information according to a start location or an end location of the second signal in the bandwidth used by the user equipment, where the start location or the end location of the second signal in the bandwidth used by the user equipment is a start location or an end location of a bandwidth corresponding to a sequence of the second signal, a size of the bandwidth corresponding to the sequence of the second signal is predefined or is notified by a base station or blindly detected, and the bandwidth corresponding to the sequence of the second signal is a transmission bandwidth or a carrier bandwidth of the second signal.

With reference to the fifth implementable manner, in a sixth implementable manner, the second signal is one or more of a reference signal, a primary synchronization signal PSS, or a secondary synchronization signal SSS, the reference signal includes one or more of a cell-specific reference signal CRS or a CSI-RS, the start location or the end location of the second signal in the bandwidth used by the user equipment includes a boundary at which the bandwidth used by the user equipment overlaps the carrier bandwidth of the second signal, and the second signal is a signal or a channel used to determine the boundary.

With reference to any one of the third aspect, or the first to the fourth implementable manners, in a seventh implementable manner, the receiving unit is specifically configured to:

receive the first information sent by a base station.

With reference to any one of the third aspect, or the first to the seventh implementable manners, in an eighth implementable manner, the processing unit is specifically configured to:

a resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

With reference to any one of the third aspect, or the first to the eighth implementable manners, in a ninth implementable manner, the processing unit is further configured to use, as a start location or an end location for numbering resource blocks in the bandwidth used by the user equipment, the location indicated by the first information, and number, according to the resource block cyclic shift manner or according to a resource block consecutive numbering manner, the resource blocks in the bandwidth used by the user equipment; or the processing unit is further configured to use, as a start location for numbering resource blocks, a start location in the bandwidth used by the user equipment, to consecutively number the resource blocks; or the processing unit is further configured to use, as an end location for numbering resource blocks, an end location in the bandwidth used by the user equipment, to consecutively number the resource blocks.

With reference to the ninth implementable manner, in a tenth implementable manner, the processing unit is specifically configured to:

a maximum number of the resource blocks is greater than a quantity of resource blocks included in the bandwidth used by the user equipment; and/or a minimum number of the resource blocks is L, where L is a positive integer greater than or equal to 1.

With reference to the tenth implementable manner, in an eleventh implementable manner, the maximum number of the resource blocks is configured by higher layer signaling.

With reference to the tenth implementable manner, in a twelfth implementable manner, the minimum number of the resource blocks is configured by higher layer signaling.

With reference to any one of the tenth to the twelfth implementable manners, in a thirteenth implementable manner, numbers of the resource blocks of the user equipment are the same as numbers of corresponding resource blocks of a first base station, and the first base station is a base station that communicates with the user equipment.

With reference to any one of the third aspect, or the first to the thirteenth implementable manners, in a fourteenth implementable manner, the bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth used by the user equipment and the non-overlapping bandwidth in the second bandwidth have a same size.

According to a fourth aspect, a base station is provided and includes:

a processing unit, configured to determine first information, where the first information is used to indicate a cyclic shift start resource block location or a cyclic shift end resource block location for resource mapping of a first channel or a first signal in a resource block cyclic shift manner in a bandwidth used by user equipment, where the processing unit is further configured to determine, according to the resource block cyclic shift manner and the first information, a resource mapping location of the first channel or the first signal in the bandwidth used by the user equipment;

a receiving unit, configured to receive the first channel or the first signal at the resource mapping location; and a sending unit, configured to send the first channel or the first signal at the resource mapping location.

With reference to the fourth aspect, in a first implementable manner, the processing unit is specifically configured to:

determine a resource block cyclic shift deviation value according to the first information, and determine, in the resource block cyclic shift manner according to the deviation value, the resource mapping location of the first channel or the first signal in the bandwidth used by the user equipment, where the resource block cyclic shift deviation value is a value of a deviation between the cyclic shift start resource block location for resource mapping corresponding to the first information and a start resource block location in the bandwidth used by the user equipment; or the resource block cyclic shift deviation value is a value of a deviation between the cyclic shift end resource block location for resource mapping corresponding to the first information and an end resource block location in the bandwidth used by the user equipment.

With reference to the fourth aspect or the first implementable manner, in a second implementable manner, the processing unit is specifically configured to:

determine, according to the cyclic shift start resource block location or the cyclic shift end resource block location indicated by the first information and the resource block cyclic shift deviation value corresponding to the first channel or the first signal, a resource mapping start location or end location of the first channel or the first signal in the bandwidth used by the user equipment; and determine, according to the resource block cyclic shift manner, all resource mapping locations for resource mapping of the first channel or the first signal in the bandwidth used by the user equipment.

With reference to any one of the fourth aspect, or the first or the second implementable manner, in a third implementable manner, the first channel is one or more of a physical control format indicator channel PCFICH, a physical downlink control channel PDCCH, an enhanced physical downlink control channel EPDCCH, a physical hybrid ARQ indicator channel PHICH, a physical broadcast channel PBCH, a physical uplink control channel PUCCH, or a physical random access channel PRACH; and the first signal is one or more of a reference signal, a primary synchronization signal PSS, or a secondary synchronization signal SSS, where the reference signal includes one or more of a cell-specific reference signal CRS, a channel state information-reference signal CSI-RS, a positioning reference signal PRS, a discovery reference signal DRS, or a sounding reference signal SRS.

With reference to any one of the fourth aspect, or the first to the third implementable manners, in a fourth implementable manner, different types of first channels and/or different first signals have a same cyclic shift start resource block location for resource mapping; and/or different types of first channels and/or different first signals have a same cyclic shift end resource block location for resource mapping; and/or different types of first channels and/or different first signals have a same cyclic shift deviation value for resource mapping; and/or cyclic shift deviation values or a cyclic shift deviation value for resource mapping of an uplink first channel and/or an uplink first signal are/is different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal are/is different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal are/is different from cyclic shift deviation values or a cyclic shift deviation value for resource mapping of the downlink first channel and/or the downlink first signal.

With reference to any one of the fourth aspect, or the first to the fourth implementable manners, in a fifth implementable manner, the sending unit is further configured to send a second signal, and determine the first information according to a start location or an end location of the second signal in the bandwidth used by the user equipment, where the start location or the end location of the second signal in the bandwidth used by the user equipment is a start location or an end location of a bandwidth corresponding to a sequence of the second signal, a size of the bandwidth corresponding to the sequence of the second signal is predefined or is notified by the base station or blindly detected, and the bandwidth corresponding to the sequence of the second signal is a transmission bandwidth or a carrier bandwidth of the second signal.

With reference to the fifth implementable manner, in a sixth implementable manner, the second signal is one or more of a reference signal, a primary synchronization signal PSS, or a secondary synchronization signal SSS, the reference signal includes one or more of a cell-specific reference signal CRS or a CSI-RS, the start location or the end location of the second signal in the bandwidth used by the user equipment includes a boundary at which the bandwidth used by the user equipment overlaps the carrier bandwidth of the second signal, and the second signal is a signal or a channel used to determine the boundary.

With reference to any one of the fourth aspect, or the first to the sixth implementable manners, in a seventh implementable manner, the sending unit is further configured to send the first information.

With reference to any one of the fourth aspect, or the first to the seventh implementable manners, in an eighth implementable manner, the processing unit is specifically configured to:

a resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

With reference to any one of the fourth aspect, or the first to the eighth implementable manners, in a ninth implementable manner, the processing unit is further configured to use, as a start location or an end location for numbering resource blocks in the bandwidth used by the user equipment, the location indicated by the first information, and number, according to the resource block cyclic shift manner or according to a resource block consecutive numbering manner, the resource blocks in the bandwidth used by the user equipment; or the processing unit is further configured to use, as a start location for numbering resource blocks, a start location in the bandwidth used by the user equipment, to consecutively number the resource blocks; or the processing unit is further configured to use, as an end location for numbering resource blocks, an end location in the bandwidth used by the user equipment, to consecutively number the resource blocks.

With reference to the ninth implementable manner, in a tenth implementable manner, the processing unit is specifically configured to:

a maximum number of the resource blocks is greater than a quantity of resource blocks included in the bandwidth used by the user equipment; and/or a minimum number of the resource blocks is L, where L is a positive integer greater than or equal to 1.

With reference to the tenth implementable manner, in an eleventh implementable manner, the sending unit is further configured to:

send higher layer signaling to the user equipment, where the higher layer signaling is used to configure the maximum number of the resource blocks.

With reference to the tenth implementable manner, in a twelfth implementable manner, the sending unit is further configured to:

send higher layer signaling to the user equipment, where the higher layer signaling is used to configure the minimum number of the resource blocks.

With reference to any one of the tenth to the twelfth implementable manners, in a thirteenth implementable manner, in the bandwidth used by the user equipment, numbers of the resource blocks of the user equipment are the same as numbers of corresponding resource blocks of the base station.

With reference to any one of the fourth aspect, or the first to the thirteenth implementable manners, in a fourteenth implementable manner, the bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth of the user equipment and the non-overlapping bandwidth in the second bandwidth have a same size.

With reference to any one of the fourth aspect, or the first to the thirteenth implementable manners, in a fifteenth implementable manner, a bandwidth used by the base station includes bandwidths used by at least two user equipments, the bandwidths used by the two user equipments have an overlapping part, and a same resource block for the two user equipments has a same resource block number on the overlapping part; or resource blocks in total bandwidths used by the two user equipments are consecutively numbered; or resource blocks in total bandwidths used by the two user equipments are numbered in a cyclic shift manner, where a maximum number is greater than or equal to a total quantity of the resource blocks in the total bandwidths used by the two user equipments, or/and a minimum number is 0 or 1 or L, where L is a positive integer greater than 1; or a bandwidth used by the base station includes bandwidths used by at least two user equipments, the bandwidths used by the two user equipments have an overlapping part, the base station maps first channels or first signals of the two user equipments to the overlapping part, and parts of the first channels or the first signals of the two user equipments in the overlapping area are the same or different.

The embodiments of the present invention provide the resource mapping method and the apparatus. The resource mapping location of the first channel or the first signal in the bandwidth used by the user equipment is determined according to the resource block cyclic shift manner and the obtained first information, so that the first channel or the first signal is received or sent at the resource mapping location. The first information is used to indicate the cyclic shift start resource block location or the cyclic shift end resource block location for resource mapping of the first channel or the first signal in the resource block cyclic shift manner in the bandwidth used by the user equipment. In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented by using the bandwidth used by the user equipment, and normal communication between a base station system and the user equipment is ensured. Further, the bandwidth used by the user equipment may vary with a capability of the user equipment. In this way, different user equipments may use different bandwidths. Such channel or signal resource mapping designed according to a bandwidth used by a user improves channel or signal transmission flexibility.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
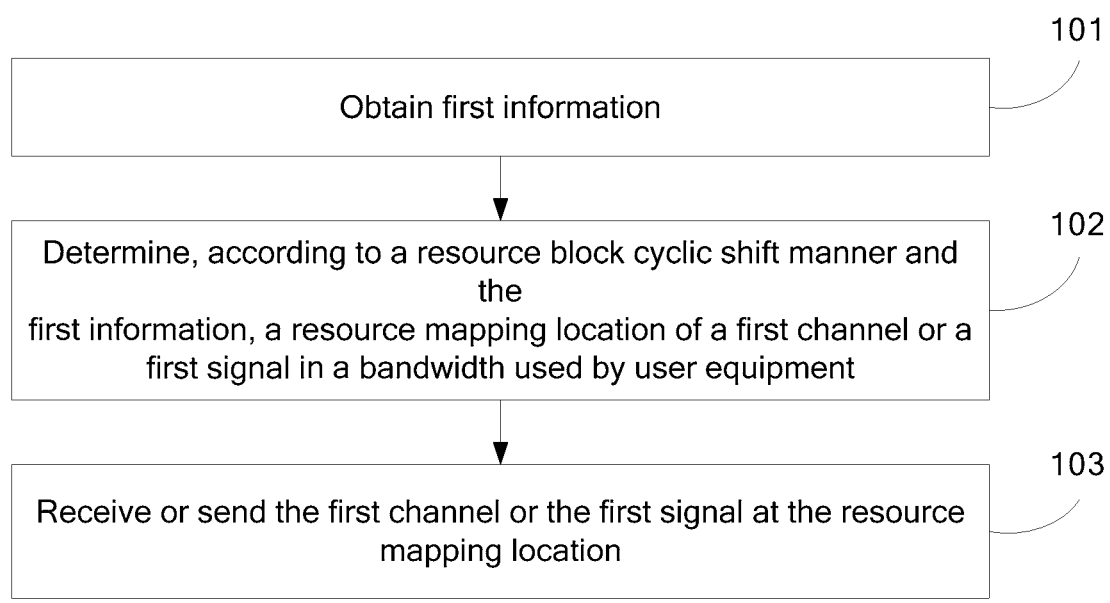
FIG. 1 is a flowchart of a resource mapping method according to an embodiment of the present invention.

An embodiment of the present invention provides a resource mapping method, and the method is applied to user equipment. As shown in FIG. 1, the method includes the following steps.

Step 101: Obtain first information.

The first information is used to indicate a cyclic shift start resource block location or a cyclic shift end resource block location for resource mapping of a first channel or a first signal in a resource block cyclic shift manner in a bandwidth used by the user equipment.

Step 102: Determine, according to a resource block cyclic shift manner and the first information, a resource mapping location of the first channel or the first signal in a bandwidth used by the user equipment.

Step 103: Receive or send the first channel or the first signal at the resource mapping location.

Figure 2:
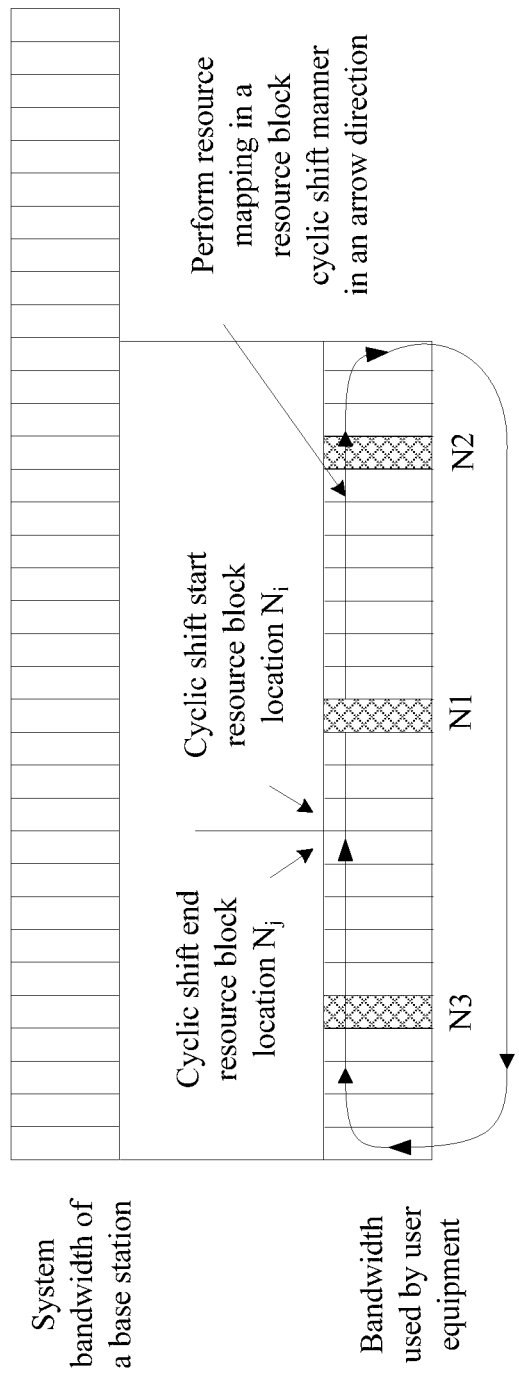
FIG. 2 is a schematic diagram of resource mapping according to an embodiment of the present invention.

As shown in FIG. 2, in the bandwidth used by the user equipment, resource mapping is performed in a resource block cyclic shift manner. Resource blocks at the cyclic shift start resource block location and the cyclic shift end resource block location are two cyclically neighboring resource blocks. The location that the first information is used to indicate is a cyclic shift start resource block location $N_i$ or cyclic shift end resource block location $N_j$ at which resource mapping of the first channel or the first signal can be performed in the bandwidth used by the user equipment in FIG. 2. Resource blocks at the cyclic shift start resource block location $N_i$ and the cyclic shift end resource block location $N_j$ are two cyclically neighboring resource blocks. After obtaining the first information, the user equipment determines an available resource of the first channel or the first signal and a resource block mapping order in the resource block cyclic shift manner by using the cyclic shift start resource block location as a startpoint or using the cyclic shift end resource block location as an endpoint, determines the resource mapping location of the first channel or the first signal in the bandwidth used by the user equipment, and then sends or receives the first channel or the first signal according to the location. For example, a channel or a signal is mapped to three resource blocks in the bandwidth used by the user equipment, and the resource blocks to which the channel or the signal is mapped in the resource block cyclic shift mapping manner are respectively resource blocks N1, N2, and N3 shown in FIG. 2.

The resource mapping location of the first channel or the first signal of the bandwidth used by the user equipment is determined according to the resource block cyclic shift manner and the obtained first information, so that the first channel or the first signal is received or sent at the resource mapping location. The first information is used to indicate the cyclic shift start resource block location or the cyclic shift end resource block location for resource mapping of the first channel or the first signal in the resource block cyclic shift manner in the bandwidth used by the user equipment. In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented by using the bandwidth used by the user equipment, and normal communication between a base station system and the user equipment is ensured. Further, the bandwidth used by the user equipment may vary with a capability of the user equipment. In this way, different user equipments may use different bandwidths. Such channel or signal resource mapping designed according to a bandwidth used by a user improves channel or signal transmission flexibility.

Figure 3:
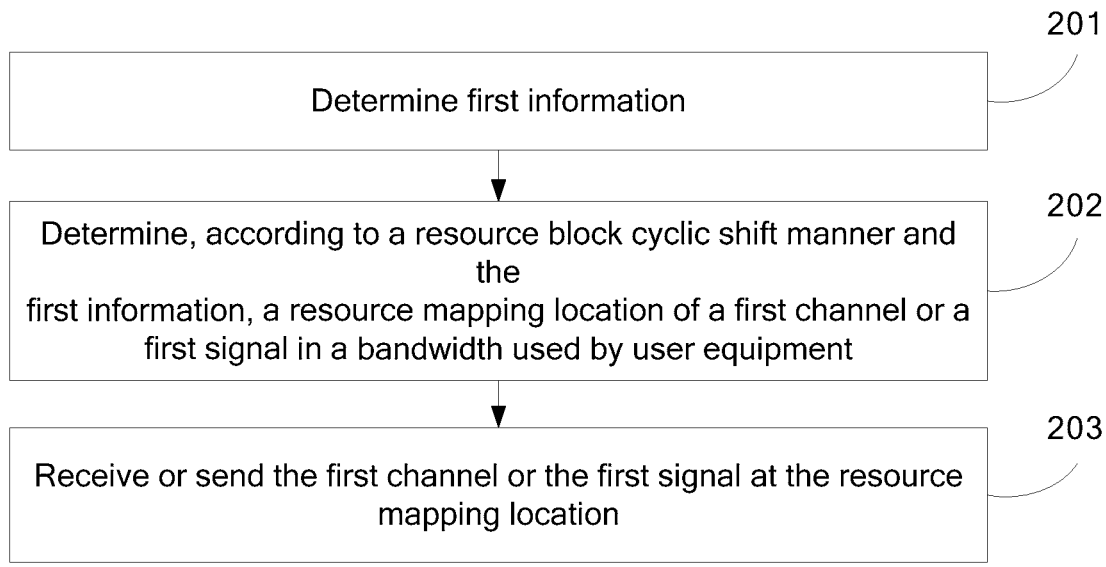
FIG. 3 is a flowchart of a resource mapping method according to an embodiment of the present invention.

An embodiment of the present invention provides a resource mapping method, and the method is applied to a base station. As shown in FIG. 3, the method includes the following steps.

Step 201: Determine first information.

The first information is used to indicate a cyclic shift start resource block location or a cyclic shift end resource block location for resource mapping of a first channel or a first signal in a resource block cyclic shift manner in a bandwidth used by user equipment.

Step 202: Determine, according to a resource block cyclic shift manner and the first information, a resource mapping location of the first channel or the first signal in a bandwidth used by the user equipment.

Step 203: Receive or send the first channel or the first signal at the resource mapping location.

The resource mapping location of the first channel or the first signal in the bandwidth used by the user equipment is determined according to the resource block cyclic shift manner and the determined first information, so that the first channel or the first signal is received or sent at the resource mapping location. The first information is used to indicate the cyclic shift start resource block location or the cyclic shift end resource block location for resource mapping of the first channel or the first signal in the resource block cyclic shift manner in the bandwidth used by the user equipment.

In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented by using the bandwidth used by the user equipment, and normal communication between a base station system and the user equipment is ensured. Further, the bandwidth used by the user equipment may vary with a capability of the user equipment. In this way, different user equipments may use different bandwidths. Such channel or signal resource mapping designed according to a bandwidth used by a user improves channel or signal transmission flexibility.

Figure 4:
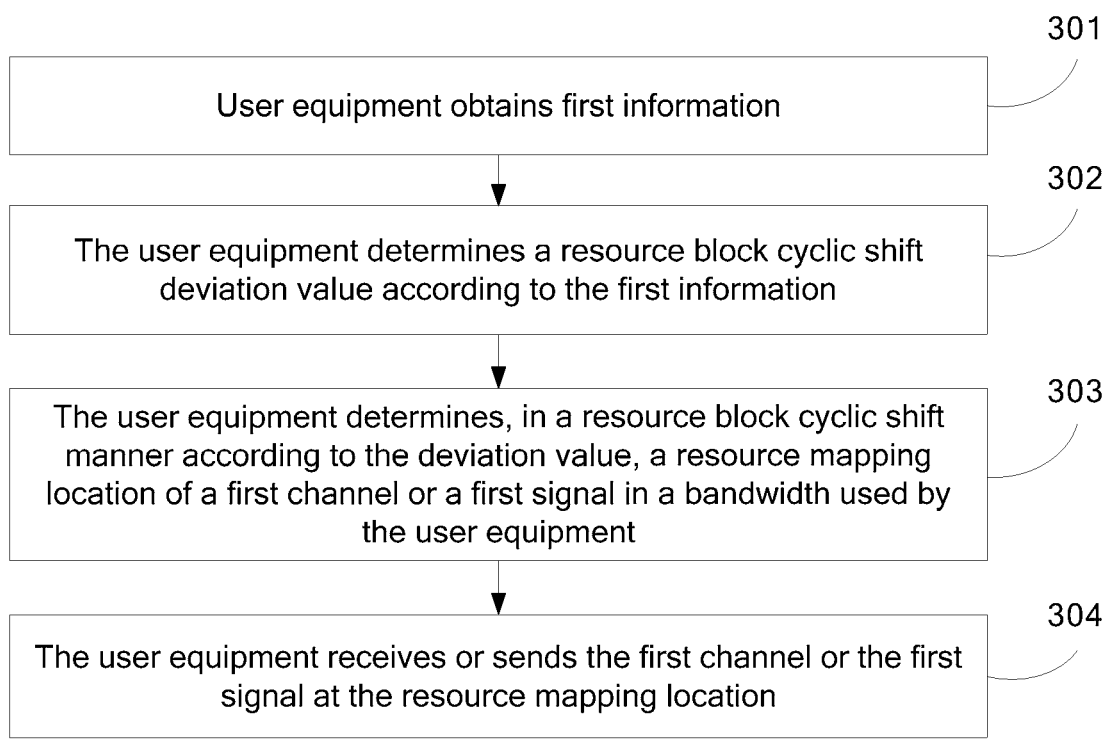
FIG. 4 is a flowchart of a resource mapping method according to an embodiment of the present invention.

An embodiment of the present invention provides a resource mapping method. As shown in FIG. 4, the method includes the following steps.

Step 301: User equipment obtains first information.

The first information is used to indicate a cyclic shift start resource block location or a cyclic shift end resource block location for resource mapping of a first channel or a first signal in a resource block cyclic shift manner in a bandwidth used by the user equipment.

The first channel is one or more of a PCFICH, a PDCCH, an enhanced physical downlink control channel (EPDCCH), a PHICH, a PBCH, a PUCCH, or a PRACH. The first signal is one or more of a reference signal, a PSS, or an SSS. The reference signal includes one or more of a CRS, a CSI-RS, a positioning reference signal (PRS), a discovery reference signal (DRS), or a sounding reference signal (SRS). In addition, the first channel or the first signal may be any other defined channel or signal, for example, a physical multicast channel (PMCH), and no particular limitation is imposed in the present invention.

Optionally, a base station determines the first information, and the user equipment receives the first information sent by the base station. The first information is carried in semi-static signaling, for example, radio resource control (RRC) dedicated signaling. A main advantage is that no fast change is required. The first information is associated with the bandwidth used by the user equipment and a capability of the user equipment, and may be notified when the bandwidth is configured for the user equipment. Therefore, signaling overheads may be reduced. In addition, dedicated signaling may meet a requirement that different user equipments have different configurations, and a configuration of the user equipment is flexible.

Optionally, the user equipment blindly detects a second signal, and determines the first information according to a start location or an end location of the second signal in the bandwidth used by the user equipment. The start location or the end location of the second signal in the bandwidth used by the user equipment is a start location or an end location of a bandwidth corresponding to a sequence of the second signal. A size of the bandwidth corresponding to the sequence of the second signal is predefined or notified by the base station. The bandwidth corresponding to the sequence of the second signal is a transmission bandwidth or a carrier bandwidth of the second signal.

It should be noted that the second signal is one of a reference signal, a PSS, or an SSS, and the reference signal includes one of a CRS or a CSI-RS. The start location or the end location of the second signal in the bandwidth used by the user equipment includes a boundary at which the bandwidth used by the user equipment overlaps the transmission bandwidth of the second signal. The second signal is a signal or a channel used to determine the boundary.

When the second signal is the reference signal such as the CRS, the first information may be determined according to the transmission bandwidth or the carrier bandwidth of the second signal. When the second signal is the PSS, the SSS, or the like, and is not mapped to an entire carrier bandwidth, the first information may be determined according to the carrier bandwidth of the second signal. In this case, the carrier bandwidth of the second signal needs to be predefined or be configured by the base station.

Figure 5:
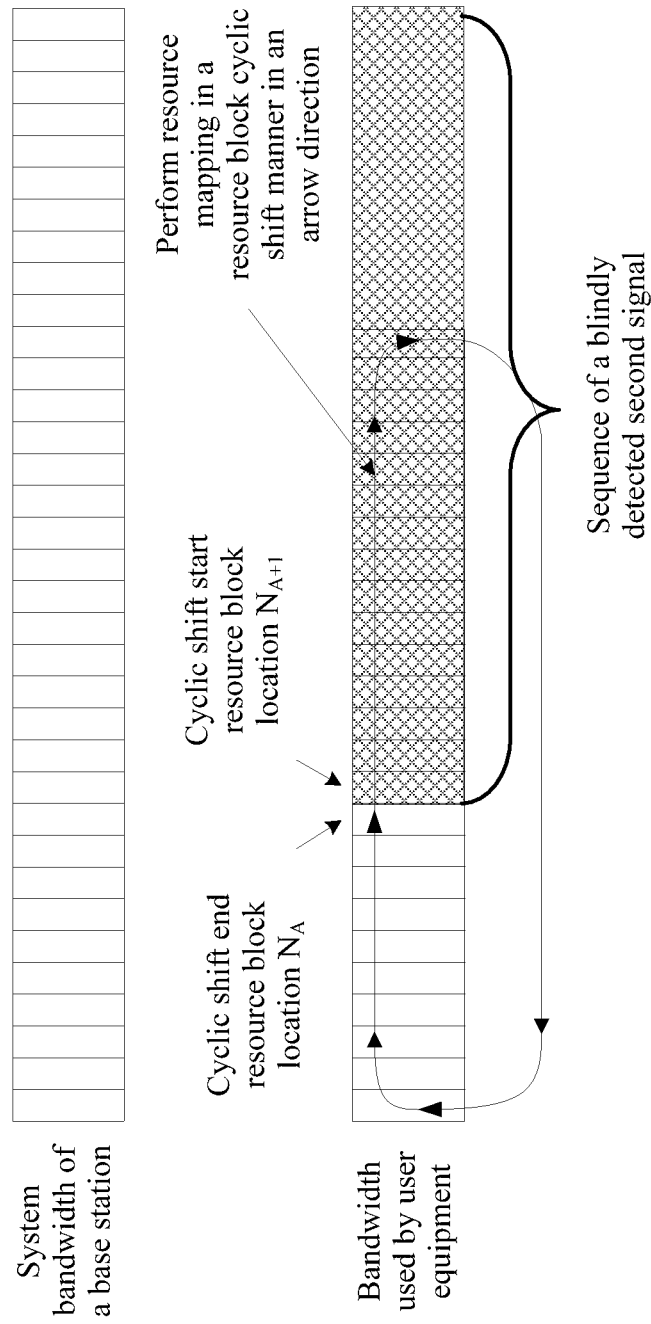
FIG. 5 is a schematic diagram of resource mapping according to an embodiment of the present invention.

For example, when the second signal is the reference signal such as the CRS, as shown in FIG. 5, the carrier bandwidth of the second signal is 5 MHz, and is used for blindly detection to determine the start location or the end location of the second signal in the bandwidth used by the user equipment, so as to determine the first information. A sequence of the CRS in the 5 MHz bandwidth is predefined. The UE blindly detects the sequence, for example, performs related detection on the sequence. When a related detection result of the detected sequence, for example, a related value, is greater than a given threshold, it is considered that the second signal and a location of the corresponding carrier bandwidth are obtained by means of blind detection. Certainly, the carrier bandwidth of the second signal may be predefined.

Alternatively, the carrier bandwidth of the second signal may be obtained by means of blind detection. For example, the UE blindly detects sequences of the second signal that are corresponding to multiple different predefined bandwidths (for example, system bandwidths). When a detection result of a sequence corresponding to at least one bandwidth exceeds a threshold value, a best matched bandwidth and a corresponding sequence may be selected as a blind detection result of the second signal, to determine the first information.

Step 302: The user equipment determines a resource block cyclic shift deviation value according to the first information.

The resource block cyclic shift deviation value is determined according to the first information. A resource mapping location of the first channel or the first signal in the bandwidth used by the user equipment is determined in the resource block cyclic shift manner according to the deviation value.

Figure 6A:
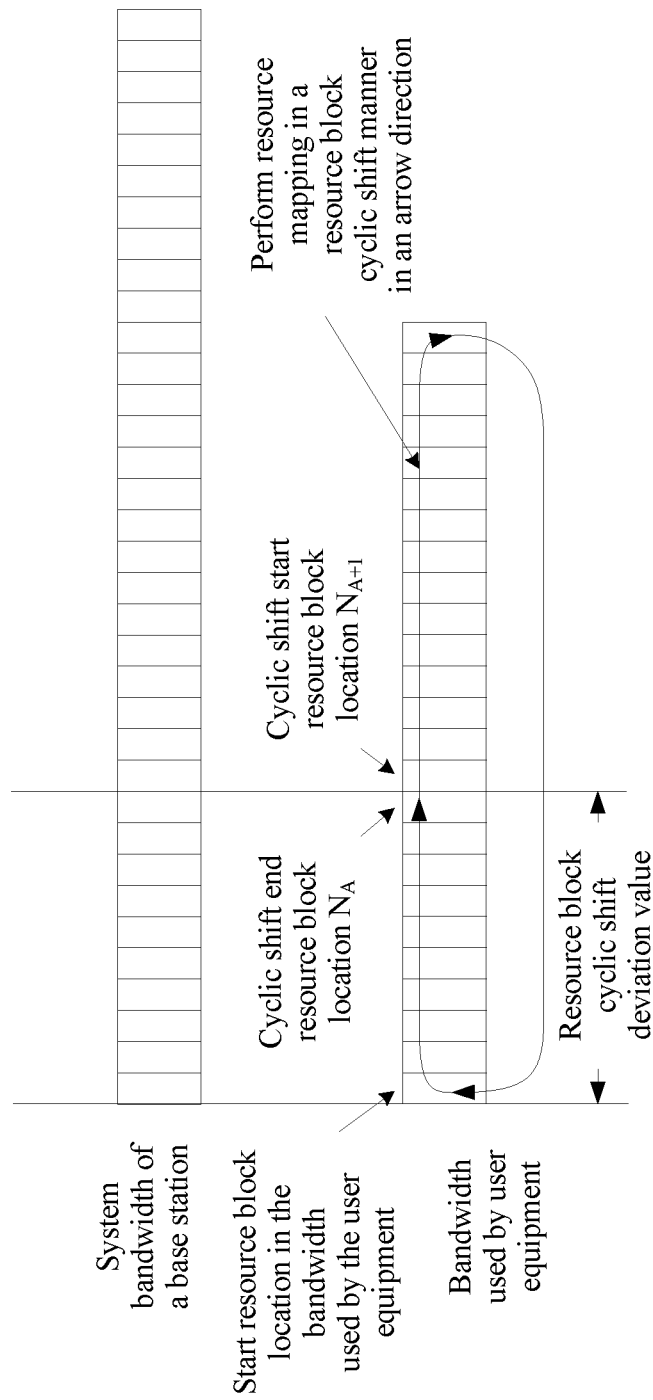
FIG. 6(a) is a schematic diagram of resource mapping according to an embodiment of the present invention.
Figure 6B:
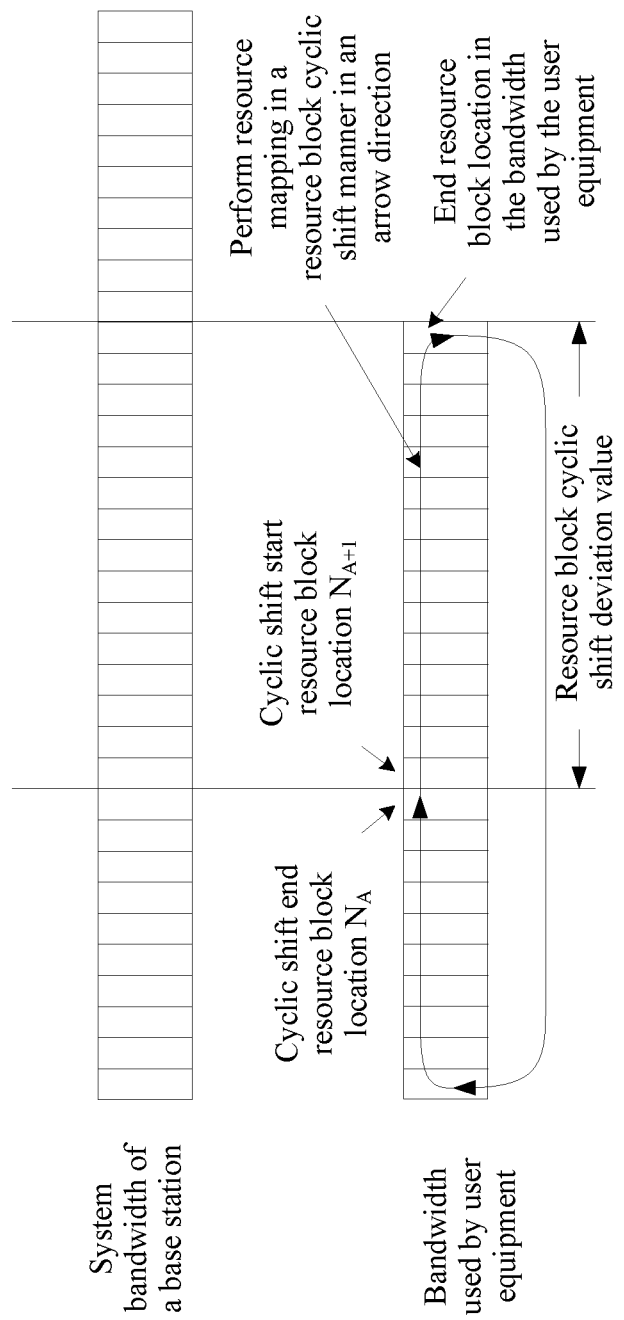
FIG. 6(b) is a schematic diagram of resource mapping according to an embodiment of the present invention.

As shown in FIG. 6(a), the resource block cyclic shift deviation value is a value of a deviation between the cyclic shift start resource block location for resource mapping corresponding to the first information and a start resource block location in the bandwidth used by the user equipment (that is, a first resource block in the bandwidth used by the user equipment). Alternatively, as shown in FIG. 6(b), the resource block cyclic shift deviation value is a value of a deviation between the cyclic shift end resource block location for resource mapping corresponding to the first information and an end resource block location in the bandwidth used by the user equipment (that is, last resource block in the bandwidth used by the user equipment).

In this embodiment of the present invention, determining, according to the resource block cyclic shift manner and the first information, the resource mapping location of the first channel or the first signal in the bandwidth used by the user equipment includes:

determining, according to the start resource block location or end resource block location indicated by the first information and a resource mapping deviation value corresponding to the first channel or the first signal, a resource mapping start location or end location of the first channel or the first signal in the bandwidth used by the user equipment; and determining, according to the resource block cyclic shift manner, all resource mapping locations for resource mapping of the first channel or the first signal in the bandwidth used by the user equipment.

Figure 7A:
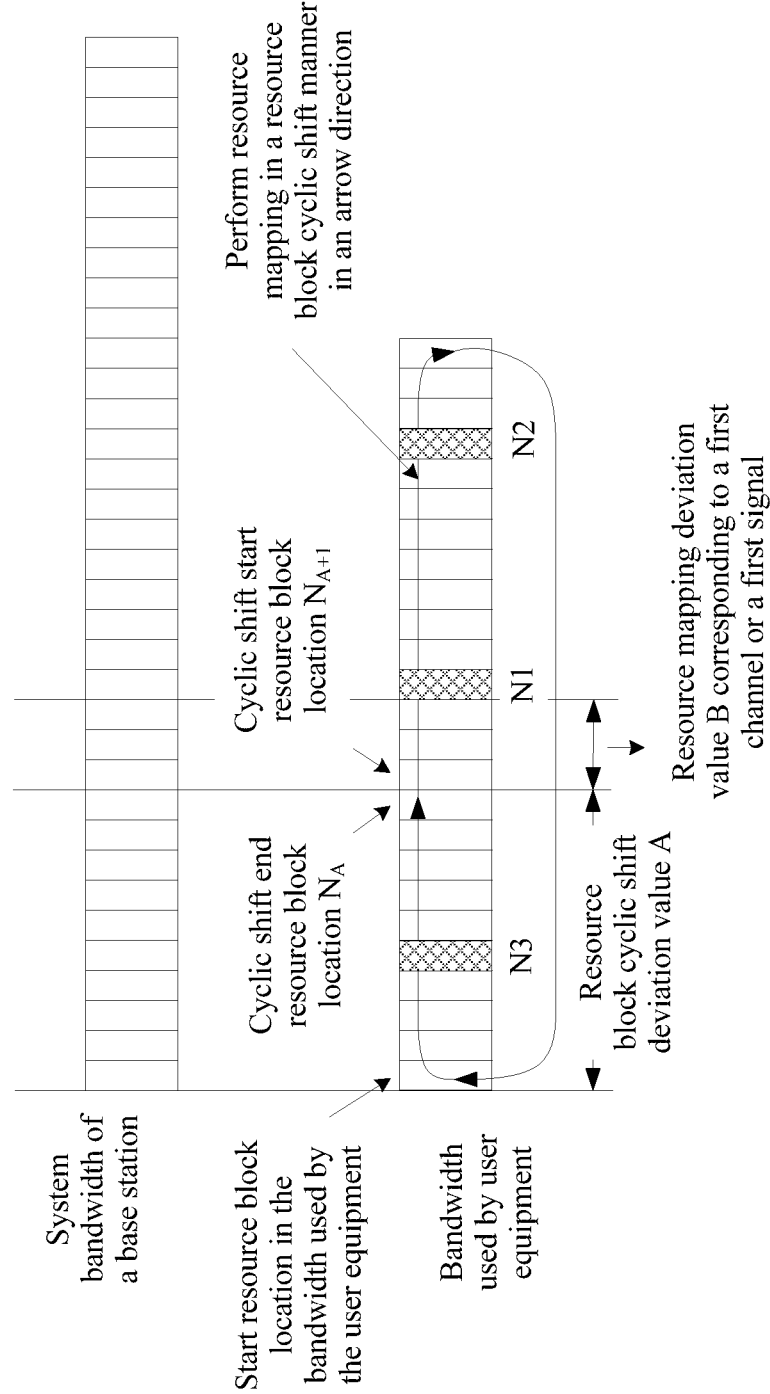
FIG. 7(a) is a schematic diagram of resource mapping according to an embodiment of the present invention.
Figure 7B:
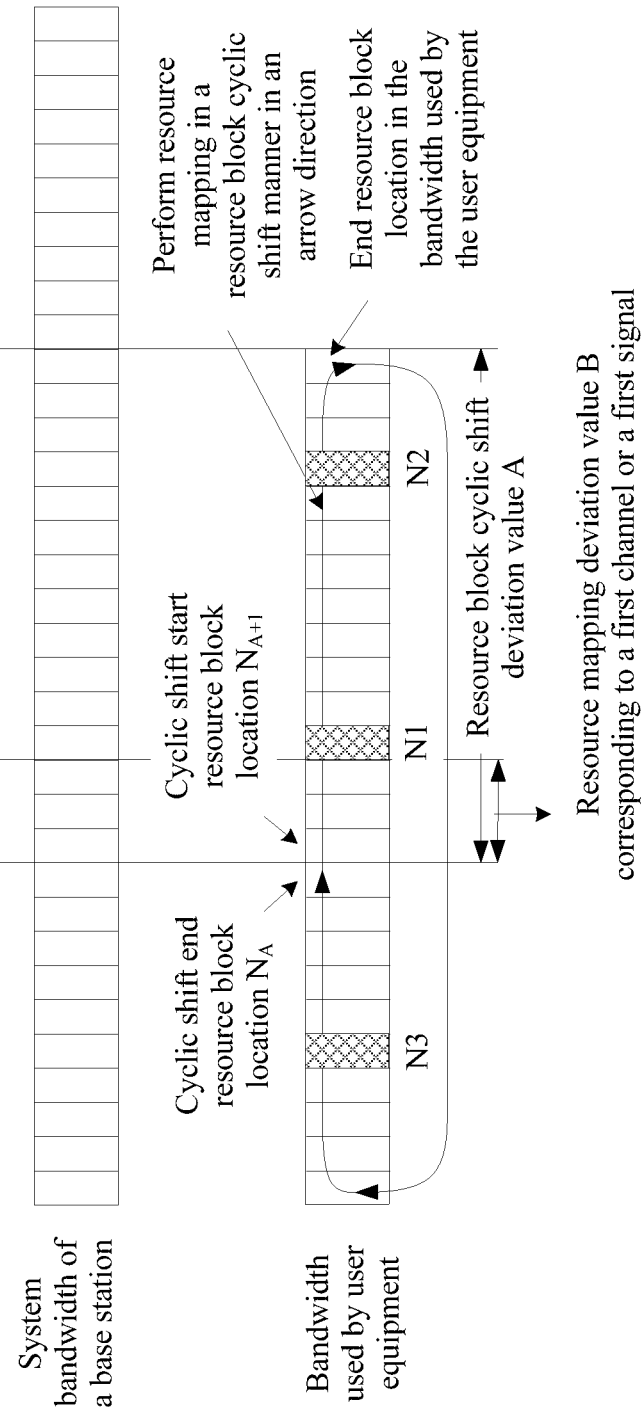
FIG. 7(b) is a schematic diagram of resource mapping according to an embodiment of the present invention.

That is, the start resource block location or the end resource block location of the resource block cyclic shift in the present invention is used to determine all available resource blocks and an order of all the available resource blocks in resource mapping, rather than a location of a first resource block or a location of last resource block in resource mapping of the first channel or the first signal. For example, in the present invention, it may be determined that a location corresponding to the first information is a resource block A. A mapping order of all resource blocks in the bandwidth used by the user equipment is determined in a cyclic shift manner. If the first channel or the first signal is shifted in the resource block cyclic shift manner from the location A by a resource mapping deviation value, for example, B resource blocks, corresponding to the first channel or the first signal, a first resource block for resource mapping of the first channel or the first signal is an $(A+B)^{th}$ resource block (as shown in FIG. 7(a)), or a first resource block for resource mapping of the first channel or the first signal is an $(A-B)^{th}$ resource block (as shown in FIG. 7(b)). All the resource mapping locations of the first channel or the first signal in the bandwidth used by the user equipment are determined according to the resource block cyclic shift manner, the first information, and the resource mapping deviation value that is corresponding to the first channel or the first signal and that is determined in the prior art, for example, in LTE.

Any two first channels in first channels may correspond to a same cyclic shift start resource block location or a same cyclic shift end resource block location for resource mapping performed in the resource block cyclic shift manner. The any two first channels may be of a same channel type corresponding to different user equipments (for example, a PDCCH channel for a user 1 and a PDCCH for a user 2) or of any two different channel types (for example, a PDCCH channel and a PCFICH channel); and/or any two first channels in first channels may correspond to a same cyclic shift deviation value for resource mapping performed in the resource block cyclic shift manner. The any two first channels may be of a same channel type corresponding to different user equipments (for example, a PDCCH channel for a user 1 and a PDCCH for a user 2) or of any two different channel types (for example, a PDCCH channel and a PCFICH channel).

Any two first signals in first signals may correspond to a same cyclic shift start resource block location or a same cyclic shift end resource block location for resource mapping performed in the resource block cyclic shift manner. The any two first signals may be of a same signal type corresponding to different user equipments (for example, a CRS signal for a user 1 and a CRS signal for a user 2) or of any two different signal types (for example, a CRS and a CSI-RS); and/or any two first signals in first signals may correspond to a same cyclic shift deviation value for resource mapping performed in the resource block cyclic shift manner. The any two first signals may be of a same signal type corresponding to different user equipments (for example, a CRS signal for a user 1 and a CRS signal for a user 2) or of any two different signal types (for example, a CRS and a CSI-RS).

The first signal and the first channel may correspond to a same cyclic shift start resource block location or a same cyclic shift end resource block location for resource mapping performed in the resource block cyclic shift manner; and or the first signal and the first channel may correspond to a same cyclic shift deviation value for resource mapping performed in the resource block cyclic shift manner.

In this embodiment of the present invention, cyclic shift deviation values or a cyclic shift deviation value for resource mapping of an uplink first channel and/or an uplink first signal may be different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal may be different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal may be different from cyclic shift deviation values or a cyclic shift deviation value for resource mapping of the downlink first channel and/or the downlink first signal. For example, an uplink PUCCH and a downlink PDCCH may have different resource block cyclic shift deviation values or be at different cyclic shift start locations or different cyclic shift end locations.

It should be noted that the resource block cyclic shift deviation value may be a value of a deviation between the cyclic shift start resource block location for resource mapping corresponding to the first information and the end resource block location in the bandwidth used by the user equipment, or the resource block cyclic shift deviation value may be a value of a deviation between the cyclic shift end resource block location for resource mapping corresponding to the first information and the start resource block location in the bandwidth used by the user equipment, or the resource block cyclic shift deviation value may be a value of a deviation between the cyclic shift end resource block location or start resource block location for resource mapping corresponding to the first information and a specific resource block location or any resource block location in the bandwidth used by the user equipment.

Step 303: The user equipment determines, in a resource block cyclic shift manner according to the deviation value, a resource mapping location of a first channel or a first signal in a bandwidth used by the user equipment.

When the user equipment determines, according to the first information, that the cyclic shift start resource block location for resource mapping of the first channel or the first signal in the resource block cyclic shift manner in the bandwidth used by the user equipment is at a $C^{th}$ resource block, a deviation from a start location of a zeroth resource block to an end location of a $(C-1)^{th}$ resource block in the bandwidth used by the user equipment is the deviation value, that is, the deviation value is C resource blocks. It is assumed that the first channel or the first signal is logically mapped to a $D^{th}$ resource block to an $E^{th}$ resource block that are relative to the zeroth resource block in the bandwidth used by the user equipment. The user equipment cyclically maps, in the resource block cyclic shift manner according to the deviation value, the first channel or the first signal to the $D^{th}$ resource block that is relative to the deviation value of C resource blocks in the bandwidth used by the user equipment. In a method in which the user equipment determines a specific location for mapping the first channel or the first signal to a resource block in the bandwidth used by the user equipment, for a mapping method for mapping the first channel or the first signal to a resource block relative to the zeroth resource block in the bandwidth used by the user equipment, refer to the prior art, for example, resource mapping corresponding to each channel or each signal in LTE. On this basis, a method for determining, in the resource block cyclic shift manner, resource mapping that is of the first channel or the first signal in the bandwidth used by the user equipment and that is relative to the deviation value is invented.

For example, a first location for mapping a PCFICH to a resource block in the bandwidth used by the user equipment is obtained by means of calculation according to formula 1.1:

$$\bar{k}=(N_{sc}^{RB}/2)\cdot(N_{ID}^{cell} \bmod 2N_{RB}^{DL}) \tag{1.1}$$

where $N_{sc}^{RB}$ represents a quantity of subcarriers of a resource block, $N_{ID}^{cell}$ represents a cell identifier, and $N_{RB}^{DL}$ represents a total quantity of resource blocks in the bandwidth used by the user equipment.

A second location for mapping the PCFICH to a resource block in the bandwidth used by the user equipment is obtained by means of calculation according to formula 1.2:

$$k=\bar{k}+\lfloor N_{RB}^{DL}/2 \rfloor \cdot N_{sc}^{RB}/2 \tag{1.2}$$

A third location for mapping the PCFICH to a resource block in the bandwidth used by the user equipment is obtained by means of calculation according to formula 1.3:

$$k=\bar{k}+\lfloor 2N_{RB}^{DL}/2 \rfloor \cdot N_{sc}^{RB}/2 \tag{1.3}$$

A fourth location for mapping the PCFICH to a resource block in the bandwidth used by the user equipment is obtained by means of calculation according to formula 1.4:

$$k=\bar{k}+\lfloor 3N_{RB}^{DL}/2 \rfloor N_{sc}^{RB}/2 \tag{1.4}$$

The user equipment may map, in the resource block cyclic shift manner according to the deviation value by using formula 1.5, the first channel or the first signal to the bandwidth used by the user equipment:

$$\bar{k}=((N_{sc}^{RB}/2)\cdot(N_{ID}^{cell} \bmod 2N_{RB}^{DL})+N_{shift}) \bmod N_{RB}^{DL} \tag{1.5},$$

where $N_{shift}$ represents the deviation value.

Figure 8:
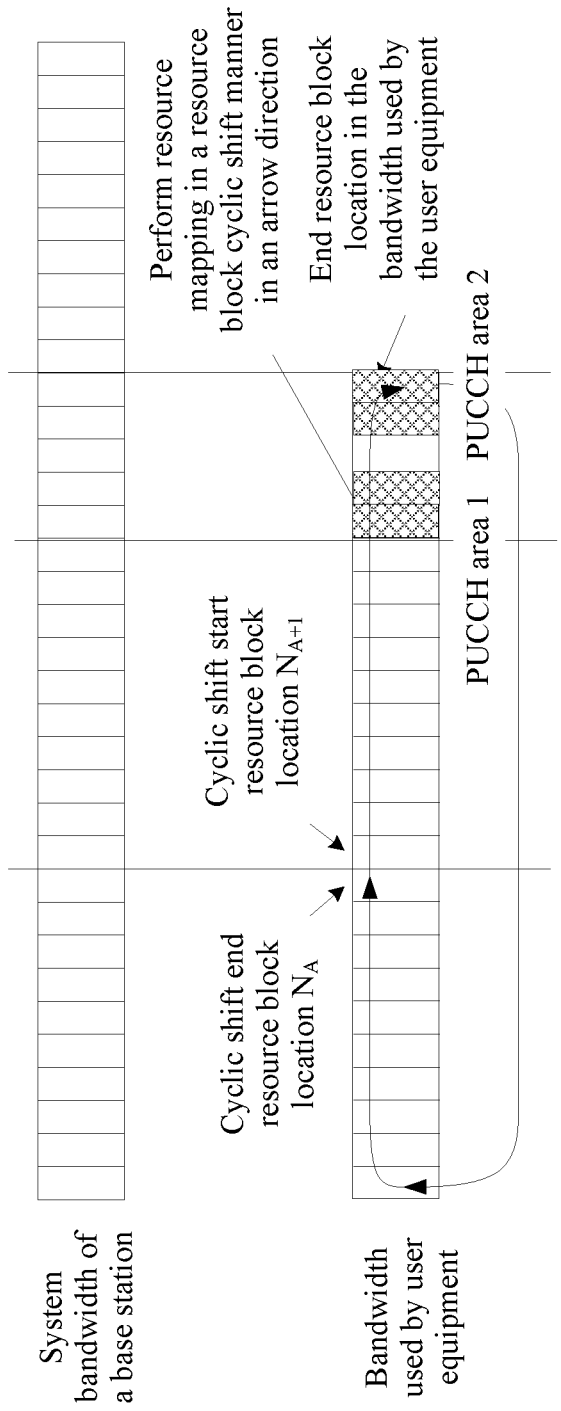
FIG. 8 is a schematic diagram of resource mapping according to an embodiment of the present invention.

In LTE, resources of a PUCCH and a PRACH are mapped to a middle location in the bandwidth used by the user equipment, and resource mapping is performed according to the resource block cyclic shift manner. As shown in FIG. 8, resource mapping of the PUCCH is performed in the resource block cyclic shift manner in an arrow direction according to the deviation value, and the PUCCH is mapped to a PUCCH area 1 and a PUCCH area 2.

In LTE, resources of a PDCCH and a PHICH are mapped to an entire bandwidth used by the user equipment in a distributed manner, but a startpoint and an endpoint for resource mapping of an available resource are still determined based on numbers of the resource blocks in the bandwidth that are numbered in an order of frequency values. A PBCH needs to be mapped to a resource block corresponding to 72 central subcarriers in the bandwidth used by the user equipment plus a deviation value. An EPDCCH, a PDSCH, a PMCH are mapped according to numbers 0 to $N_{RB}^{DL}-1$ of the resource blocks in the bandwidth used by the user equipment. In LTE, the channels or signals are all mapped based on numbers of the resource blocks in the bandwidth that are numbered in an order of frequency values.

Resource mapping of a reference signal is related to a resource block. For example, a reference signal sequence is obtained by extending by half a bandwidth in two directions of a high frequency and a low frequency by using a sequence center generated by a sequence generator as a center. Then the sequence is mapped to $N_{RB}^{DL}$ resource blocks. A PSS or an SSS is mapped to a resource block corresponding to 72 central subcarriers in the bandwidth used by the user equipment plus a deviation value.

In the resource mapping method in the present invention, resource blocks to which the first channel or the first signal is mapped change from resource blocks corresponding to original resource block numbers 0 to $N_{RB}^{DL}-1$ to resource blocks corresponding to resource block numbers 0 to $N_{RB}^{DL}-1$ determined in the present invention, that is, resource blocks corresponding to $\{(0 \sim N_{RB-1}^{DL})+\text{offset}\} \bmod N_{RB}^{DL}$, where offset represents the deviation value.

Figure 9:
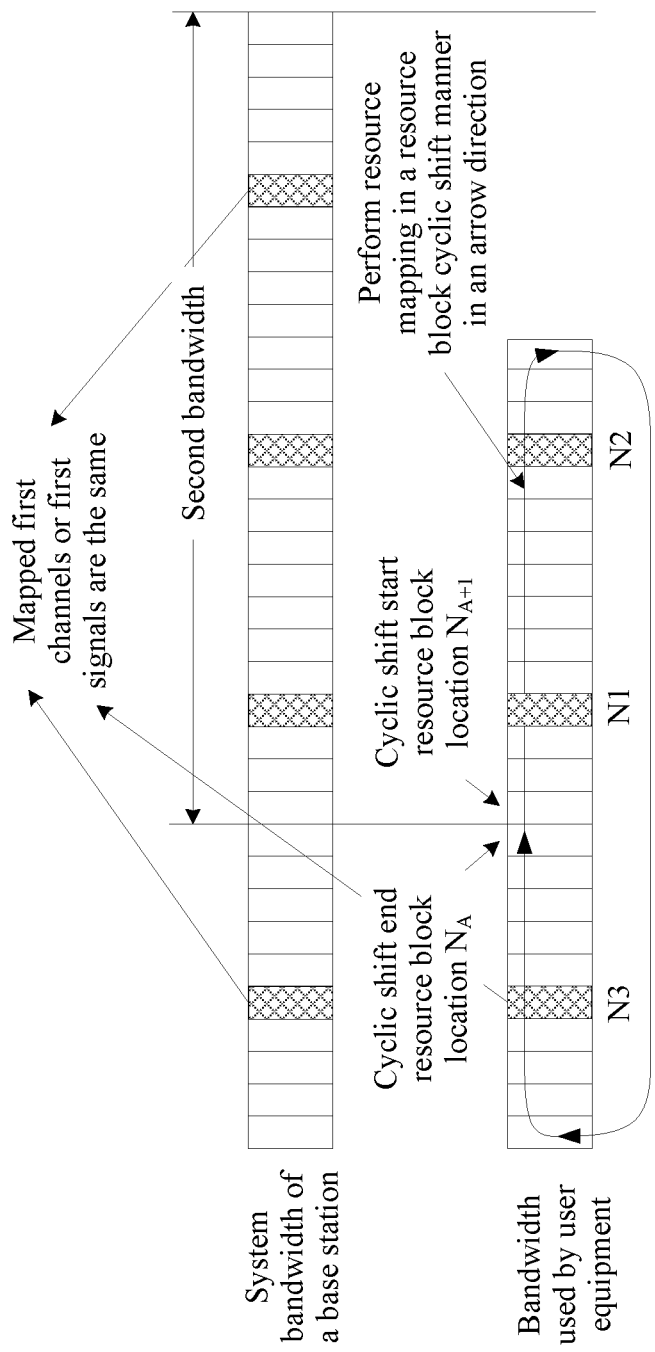
FIG. 9 is a schematic diagram of resource mapping according to an embodiment of the present invention.

In an implementation, as shown in FIG. 9, the bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth used by the user equipment and the non-overlapping bandwidth in the second bandwidth have a same size.

A resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1. Alternatively, a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1. Alternatively, a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

Step 304: The user equipment receives or sends the first channel or the first signal at the resource mapping location.

In the resource mapping method provided in this embodiment of the present invention, the resource block cyclic shift deviation value is determined according to the first information, then the resource mapping location of the first channel or the first signal in the bandwidth used by the user equipment is determined in the resource block cyclic shift manner according to the deviation value, so that the first channel or the first signal is received or sent according to the resource location in the bandwidth used by the user equipment. In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented, and normal communication between a base station system and the user equipment is ensured. Further, the bandwidth used by the user equipment may vary with a capability of the user equipment. In this way, different user equipments may use different bandwidths. Such channel or signal resource mapping designed according to a bandwidth used by a user improves channel or signal transmission flexibility.

Figure 10:
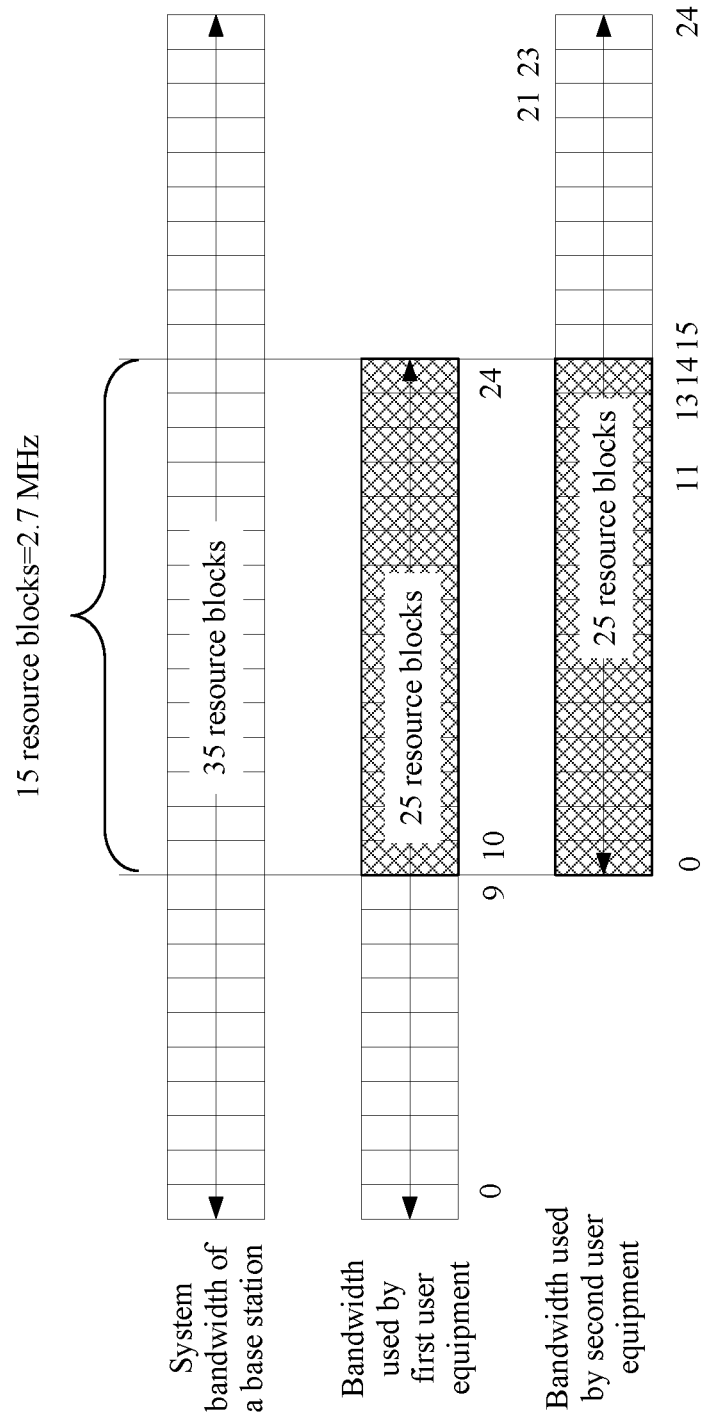
FIG. 10 is a schematic diagram of resource mapping according to an embodiment of the present invention.

As shown in FIG. 10, it is assumed that a bandwidth used by first user equipment is 5 MHz and includes 25 resource blocks. In the prior art, numbers of the 25 resource blocks are 0 to 24 according to frequency values. A bandwidth used by second user equipment is 5 MHz and includes 25 resource blocks. In LTE, numbers of the 25 resource blocks are 0 to 24 according to frequency values. A bandwidth of a base station is 7 MHz and includes 35 resource blocks. In LTE, numbers of the 35 resource blocks are 0 to 34 according to frequency values. The bandwidth used by the first user equipment is first 5 MHz of 7 MHz, and the bandwidth used by the second user equipment is last 5 MHz of 7 MHz. An end location of a twenty-fourth resource block in the bandwidth used by the first user equipment is an end location of a fourteenth resource block (a start location of a fifteenth resource block) in the bandwidth used by the second user equipment. A start location of a zeroth resource block in the bandwidth used by the second user equipment is a start location of a tenth resource block (an end location of a ninth resource block) in the bandwidth used by the first user equipment. There is an overlap of 15 resource blocks (that is, a bandwidth of 2.7 M) in the bandwidths used by the two user equipments.

Figure 11:
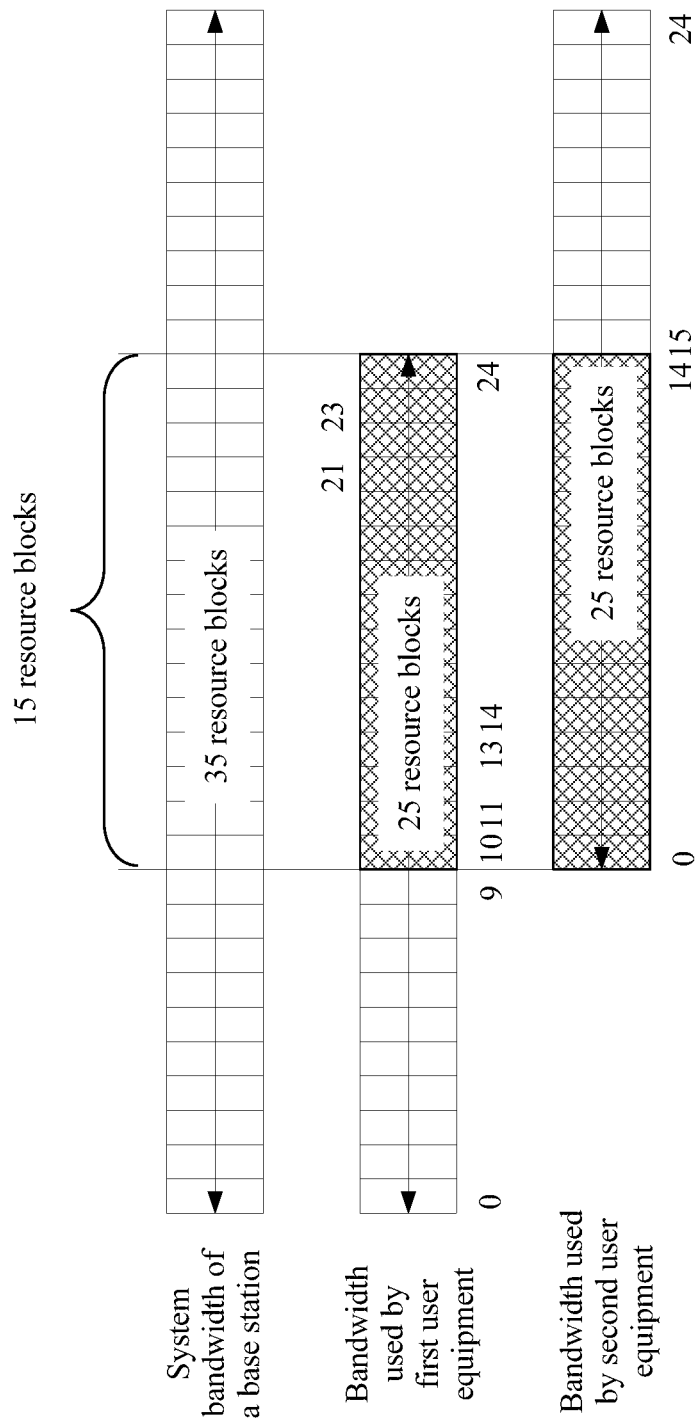
FIG. 11 is a schematic diagram of resource mapping according to an embodiment of the present invention.

For example, as shown in FIG. 11, according to this embodiment of the present invention, numbers of resource blocks of second user equipment are 0 to 24 according to frequency values. The second user equipment uses, as a deviation value, resource blocks between a start location of a zeroth resource block in a bandwidth used by first user equipment and a start location of a tenth resource block that is in the bandwidth used by the first user equipment and that is corresponding to a start location of a zeroth resource block in a bandwidth used by the second user equipment. The second user equipment shifts, by 10 resource blocks, a first channel or a first signal mapped to resource blocks whose numbers are 11 to 13, and maps the first channel or the first signal to resource blocks whose numbers are 21 to 23.

Figure 12:
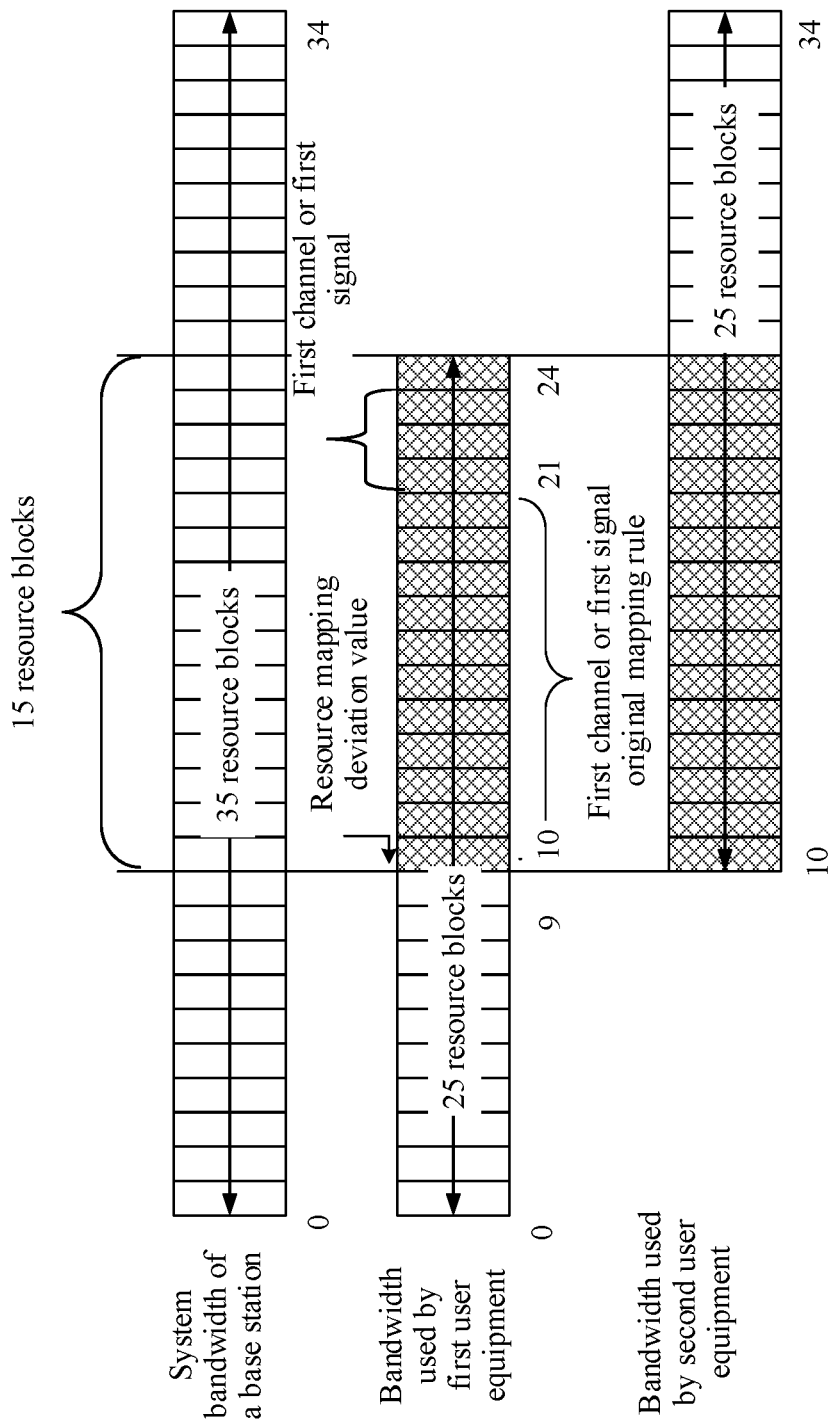
FIG. 12 is a schematic diagram of resource mapping according to an embodiment of the present invention.

Similarly, as shown in FIG. 12, according to this embodiment of the present invention, if numbers of resource blocks of first user equipment are 0 to 24 according to frequency values, and numbers of resource blocks of second user equipment are 10 to 34 according to frequency values, 15 overlapping resource blocks of the first user and 15 overlapping resource blocks of the second user have same numbers. In this way, uniform resource numbering on a base station side is ensured. The first user equipment uses, as a deviation value, resource blocks between an end location of a thirty-fourth resource block (with a resource block number 34) in a bandwidth used by second user equipment and a start location of a twenty-fifth resource block (with a resource block number 24) that is in the bandwidth used by the second user equipment and that is corresponding to an end location of a twenty-fourth resource block in a bandwidth used by the first user equipment. The first user equipment originally maps a first channel or a first signal to resource blocks whose numbers are 11 to 13 relative to a zeroth resource block, and this is referred to as a first channel or first signal original mapping rule. On this basis, the first channel or the first signal is shifted by 10 resource blocks and is mapped to resource blocks whose numbers are 21 to 23.

It should be noted that different first channels and/or different first signals have a same cyclic shift start resource block location for resource mapping; and/or different first channels and/or different first signals have a same cyclic shift end resource block location for resource mapping; and/or different first channels and/or different first signals have a same cyclic shift deviation value for resource mapping.

It should be noted that cyclic shift deviation values or a cyclic shift deviation value for resource mapping of an uplink first channel and/or an uplink first signal may be different from cyclic shift deviation values or a cyclic shift deviation value for resource mapping of a downlink first channel and/or a downlink first signal. For example, an uplink PUCCH and a downlink PDCCH may have different resource block cyclic shift deviation values or be at different cyclic shift start locations or different cyclic shift end locations.

In another implementation of the present invention, a location indicated by first information is used as a startpoint or an endpoint for numbering resource blocks in a cyclic shift manner, and then the resource blocks are numbered in sequence in the cyclic shift manner. In this way, numbers of the resource blocks change from 0–Nmax to mod(0–Nmax, shift), where mod(x,y) is a remainder obtained by dividing x by y, and Nmax is a maximum resource block number. Then resource determining and resource mapping of the first channel or the first signal are performed according to the prior art. That is, resource mapping is performed on the first channel or the first signal in a cyclic shift manner.

Figure 13:
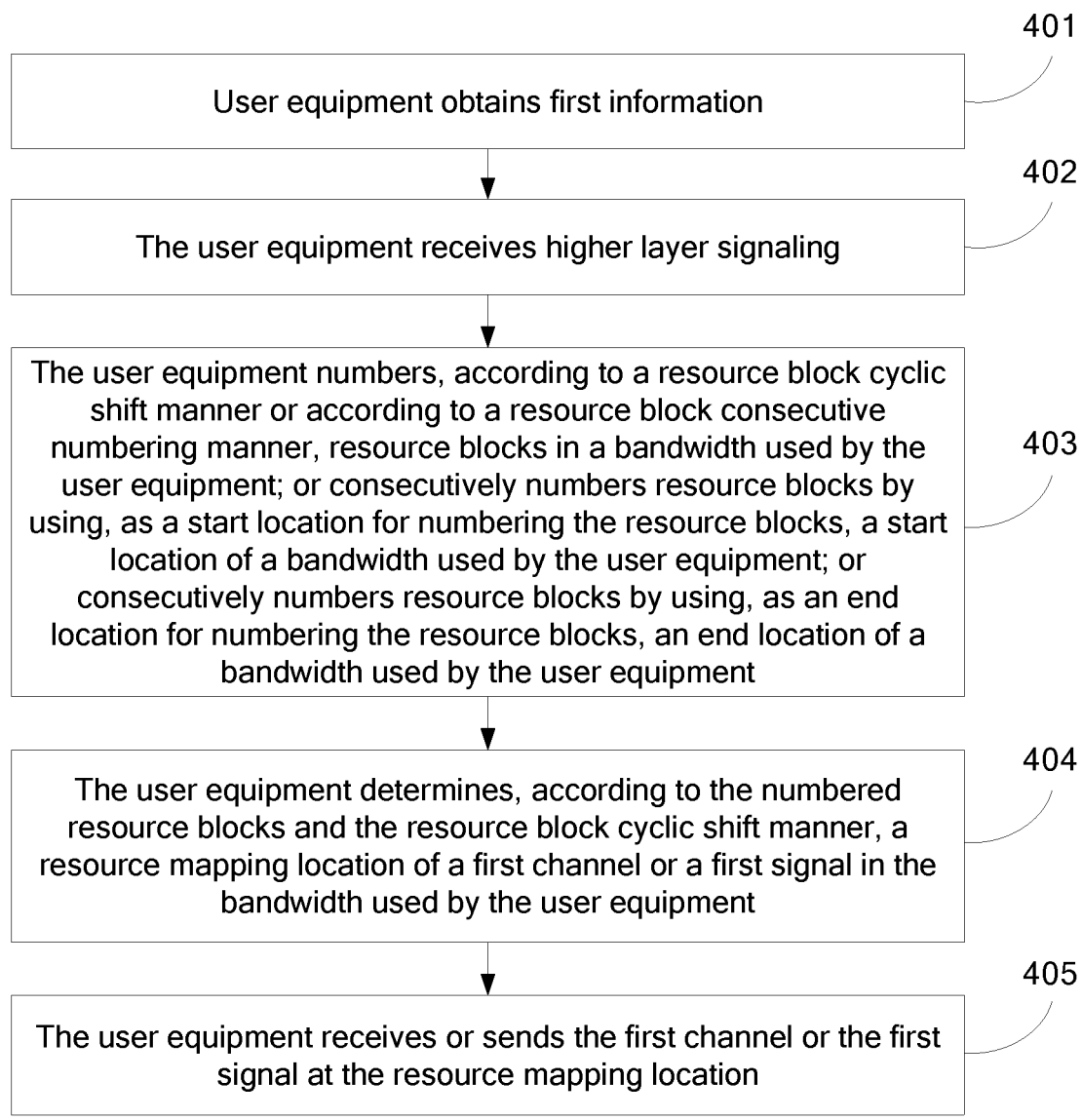
FIG. 13 is a flowchart of a resource mapping method according to an embodiment of the present invention.

An embodiment of the present invention provides a resource mapping method. As shown in FIG. 13, the method includes the following steps.

Step 401: User equipment obtains first information.

The first information is used to indicate a cyclic shift start resource block location or a cyclic shift end resource block location for resource mapping of a first channel or a first signal in a resource block cyclic shift manner in a bandwidth used by the user equipment. The first channel is one or more of a PCFICH, a PDCCH, an enhanced physical downlink control channel (EPDCCH), a PHICH, a PBCH, a PUCCH, or a PRACH. The first signal is one or more of a reference signal, a PSS, or an SSS. The reference signal includes one or more of a CRS, a CSI-RS, a positioning reference signal (PRS), a discovery reference signal (DRS), or a sounding reference signal (SRS). In addition, the first channel or the first signal may be any other defined channel or signal, for example, a physical multicast channel (PMCH), and no particular limitation is imposed in the present invention.

A manner of obtaining the first information by the user equipment is described in the foregoing embodiment. The first information is carried in semi-static signaling, for example, RRC dedicated signaling. A main advantage is that no fast change is required. The first information is associated with the bandwidth used by the user equipment and a capability of the user equipment, and may be notified when the bandwidth is configured for the user equipment. Therefore, signaling overheads may be reduced. In addition, dedicated signaling may meet a requirement that different user equipments have different configurations, and a configuration of the user equipment is flexible. A manner of determining the first information by means of blind detection has been described in the foregoing embodiment, and is not described herein again.

Step 402: The user equipment receives higher layer signaling.

The higher layer signaling includes at least one of a resource block number, a maximum resource block number, or a minimum resource block number of a base station.

Step 403: The user equipment numbers, according to a resource block cyclic shift manner or according to a resource block consecutive numbering manner, resource blocks in a bandwidth used by the user equipment; or consecutively numbers resource blocks by using, as a start location for numbering the resource blocks, a start location of a bandwidth used by the user equipment; or consecutively numbers resource blocks by using, as an end location for numbering the resource blocks, an end location of a bandwidth used by the user equipment.

The resource blocks are numbered in the following manner: The UE first determines the minimum resource block number and the maximum resource block number. The minimum resource block number and the maximum resource block number may be predefined. If the minimum resource block number and the maximum resource block number are not predefined, signaling needs to be received from a base station, and the signaling is used to indicate the minimum resource block number and the maximum resource block number. Then the resource blocks are numbered in sequence according to an order, numbering may continue in a cyclic shift manner when a boundary of the bandwidth used by the user equipment is encountered.

The user equipment uses, as a start location or an end location for numbering resource blocks in the bandwidth used by the user equipment, the location indicated by the first information, and numbers, according to the resource block cyclic shift manner or according to a resource block consecutive numbering manner, the resource blocks in the bandwidth used by the user equipment. It should be noted that numbers of the resource blocks of the user equipment are the same as numbers of corresponding resource blocks of a first base station, and the first base station is a base station that communicates with the user equipment. A maximum number of the resource blocks is greater than a quantity of resource blocks included in the bandwidth used by the user equipment, and/or a minimum number of the resource blocks is L. L is a positive integer greater than or equal to 1.

Figure 14:
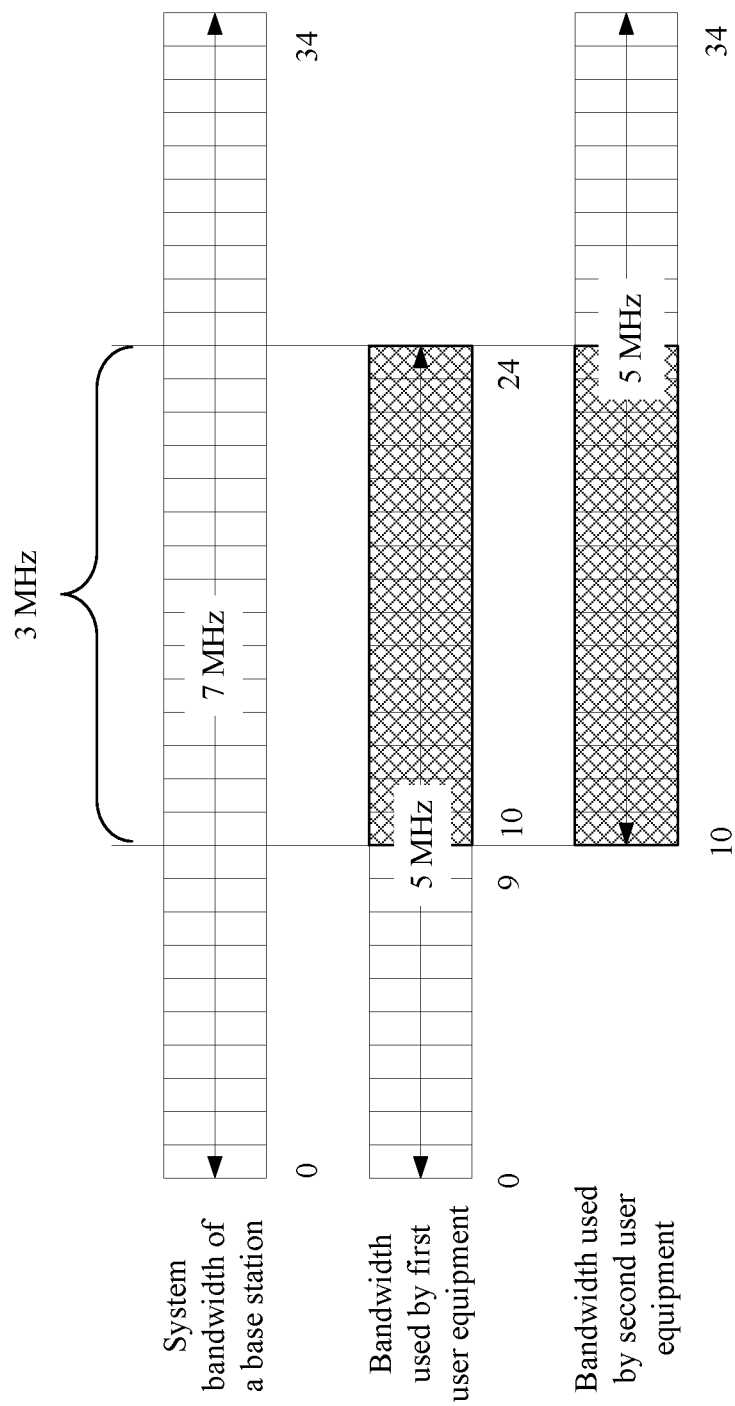
FIG. 14 is a schematic diagram of resource mapping according to an embodiment of the present invention.

As shown in FIG. 14, according to this embodiment of the present invention, it is assumed that numbers of 35 resource blocks of the base station are 0 to 34 according to frequency values. A start location of a zeroth resource block in a bandwidth used by first user equipment is corresponding to a start location of a zeroth resource block of the base station. A start location of a twenty-fourth resource block in the bandwidth used by the first user equipment is corresponding to a start location of a twenty-fourth resource block of the base station. Because numbers of resource blocks of user equipment are the same as numbers of corresponding resource blocks of a first base station, numbers of 25 resource blocks of the first user equipment are 0 to 24 according to frequency values. A start location of a zeroth resource block in a bandwidth used by second user equipment is corresponding to a start location of a tenth resource block of the base station. A start location of a twenty-fourth resource block in the bandwidth used by the second user equipment is corresponding to a start location of a thirty-fourth resource block of the base station. Because numbers of resource blocks of user equipment are the same as numbers of corresponding resource blocks of a first base station, numbers of 25 resource blocks of the first user equipment are 10 to 34 according to frequency values.

Figure 15:
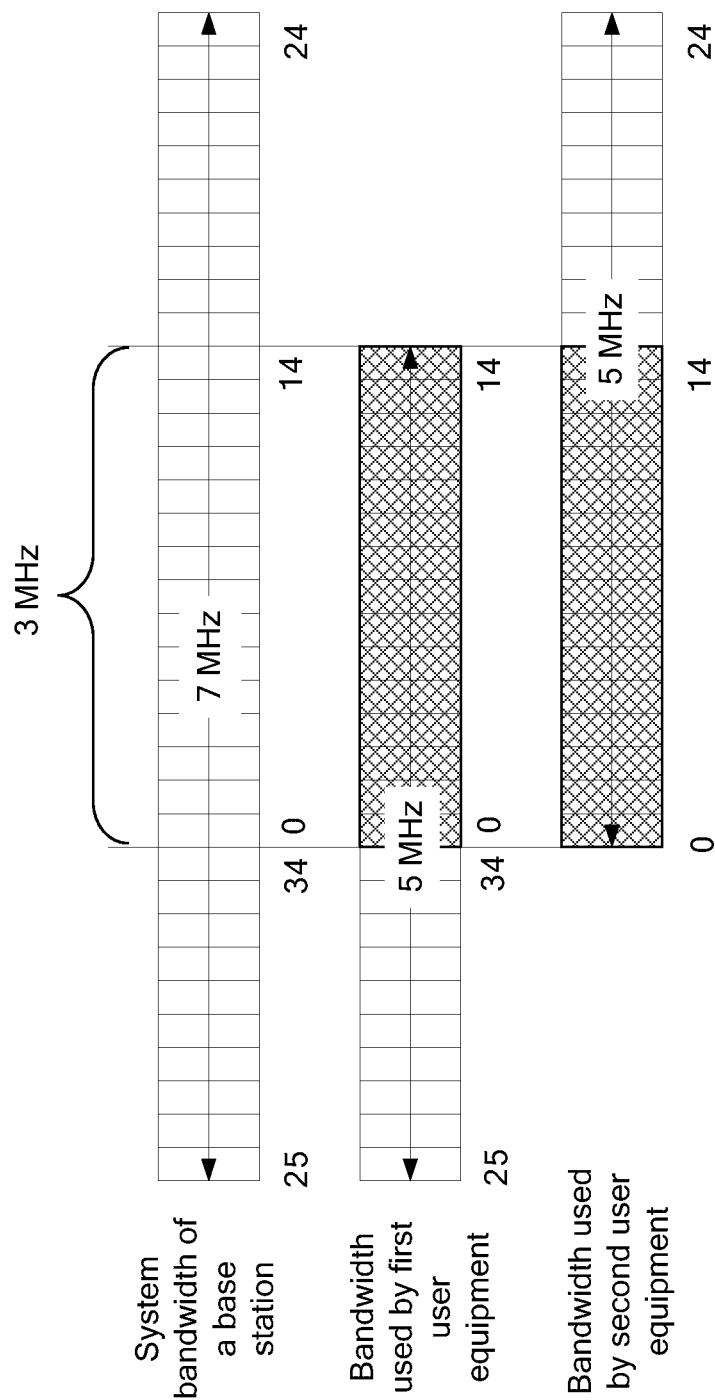
FIG. 15 is a schematic diagram of resource mapping according to an embodiment of the present invention.

As shown in FIG. 15, it is assumed that numbers of 35 resource blocks of the base station are 25 to 34 and 0 to 24. A start location of a zeroth resource block in a bandwidth used by first user equipment is corresponding to a start location of a twenty-fifth resource block of the base station. A start location of a twenty-fourth resource block in the bandwidth used by the first user equipment is corresponding to a start location of a fourteenth resource block of the base station. Because numbers of resource blocks of user equipment are the same as numbers of corresponding resource blocks of a first base station, numbers of 25 resource blocks of the first user equipment are 25 to 34 and 0 to 14. A start location of a zeroth resource block in a bandwidth used by second user equipment is corresponding to a start location of a zeroth resource block of the base station. A start location of a twenty-fourth resource block in the bandwidth used by the second user equipment is corresponding to a start location of a twenty-fourth resource block of the base station. Because numbers of resource blocks of user equipment are the same as numbers of corresponding resource blocks of a first base station, numbers of 25 resource blocks of the second user equipment are 0 to 24 according to frequency values.

Figure 16:
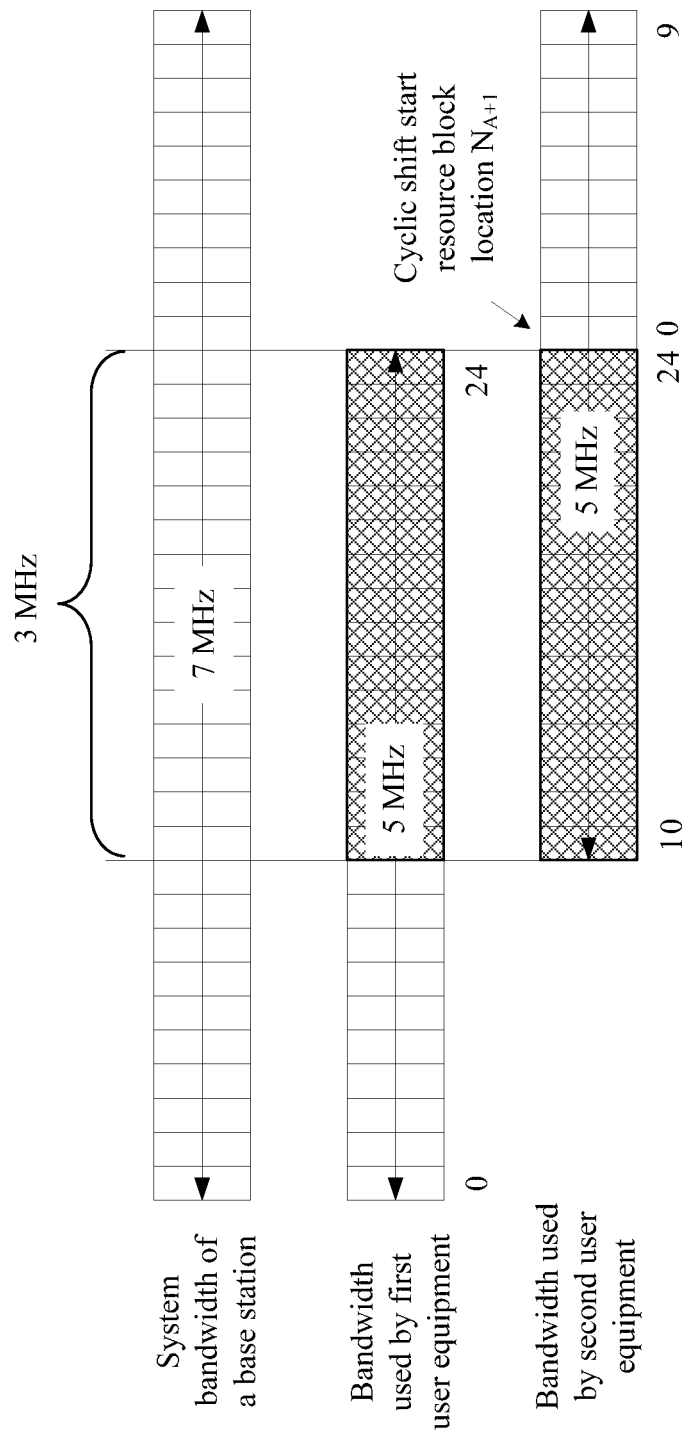
FIG. 16 is a schematic diagram of resource mapping according to an embodiment of the present invention.

As shown in FIG. 16, according to this embodiment of the present invention, a bandwidth of the base station is 7 MHz, first user equipment uses a bandwidth of first 5 MHz, and second user equipment uses a bandwidth of last 5 MHz. An overlap of the bandwidths used by the two user equipments is 3 MHz. Resource block numbers of the first user equipment may be 0 to 24. Resource blocks of the second user equipment are numbered from a cyclic shift resource block start location in a cyclic shift manner. Therefore, resource block numbers of the second user equipment become 10, 11, ..., 23, 24, 0, 1, ..., 8, and 9. A manner in which resource blocks of user equipment are numbered in the cyclic shift manner according to a cyclic shift resource block end location is similar, and is not described again.

When resource mapping of the first channel or the first signal is performed, a resource mapping location of the first channel or the first signal in the bandwidth used by the user equipment is still determined according to the resource block cyclic shift manner and the first information. A resource block number corresponding to the resource mapping location is determined according to the method provided in the present invention.

When the resource blocks in the bandwidth used by the user equipment are numbered in a cyclic shift manner, the first channel or the first signal may be directly mapped, in a manner of mapping the first channel or the first signal to a resource block in the prior art such as in LTE, to the resource blocks that are numbered in a cyclic shift manner, so as to implement cyclic shift mapping.

When numbers of resource blocks in the bandwidth used by the user equipment are the same as numbers of corresponding resource blocks of the base station, the base station has unique resource block numbers for resource block numbers of a different user. Therefore, no extra processing needs to be performed to prevent different user equipments from having same resource block numbers.

It should be noted that a resource block number in the present invention may be a physical resource block number or a virtual resource block number. When the first channel or the first signal is directly mapped in a resource block numbering manner by means of a resource block cyclic shift, the resource block number may be the virtual resource block number. When resource blocks to which the first channel or the first signal is mapped are determined according to the resource block cyclic shift manner and the first information without considering resource block numbers, the resource block number may be the physical resource block number.

It should be noted that subcarriers in a resource block in the bandwidth used by the first user equipment may be numbered in a cyclic shift manner.

A resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1. Alternatively, a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1. Alternatively, a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

Step 404: The user equipment determines, according to the numbered resource blocks and the resource block cyclic shift manner, a resource mapping location of the first channel or the first signal in the bandwidth used by the user equipment.

For example, when a start location that is of resource block numbers and that the first information is used to indicate is a tenth resource block, a number of the tenth resource block in the bandwidth used by the user equipment is a number of a resource block corresponding to the base station. Likewise, a number of another resource block in the bandwidth used by the user equipment is also a number of a resource block corresponding to the base station. It is assumed that the first channel or the first signal needs to be mapped to a thirteenth resource block to a fifteenth resource block in the bandwidth used by the user equipment. The user equipment maps, according to numbered resource blocks in the resource block cyclic shift manner, the first channel or the first signal to the resource blocks, whose numbers are 13 to 15, in the bandwidth used by the user equipment. The resource blocks, whose numbers are 13 to 15, in the bandwidth used by the user equipment are corresponding to a twenty-third resource block, a twenty-fourth resource block, and a zeroth resource block in the bandwidth used by the user equipment.

For a method for determining, by the user equipment, a specific location of a resource block, to which the first channel or the first signal is mapped, in the bandwidth used by the user equipment, refer to the prior art such as LTE.

For example, a first location for mapping a PCFICH to a resource block in the bandwidth used by the user equipment is obtained by means of calculation according to formula 2.1:

$$\bar{k} = (N_{sc}^{RB}/2) \cdot (N_{ID}^{cell} \bmod 2N_{RB}^{DL}) \qquad (2.1),$$

where $N_{sc}^{RB}$ represents a quantity of subcarriers of a resource block, $N_{ID}^{cell}$ represents a cell identifier, and $N_{RB}^{DL}$ represents a total quantity of resource blocks in the bandwidth used by the user equipment.

A second location for mapping the PCFICH to a resource block in the bandwidth used by the user equipment is obtained by means of calculation according to formula 2.2:

$$k=\bar{k}+\lfloor N_{RB}^{DL}/2 \rfloor \cdot N_{sc}^{RB}/2 \quad (2.2)$$

A third location for mapping the PCFICH to a resource block in the bandwidth used by the user equipment is obtained by means of calculation according to formula 2.3:

$$k=\bar{k}+\lfloor 2N_{RB}^{DL}/2 \rfloor \cdot N_{sc}^{RB}/2 \quad (2.3)$$

A fourth location for mapping the PCFICH to a resource block in the bandwidth used by the user equipment is obtained by means of calculation according to formula 2.4:

$$k=\bar{k}+\lfloor 3N_{RB}^{DL}/2 \rfloor \cdot N_{sc}^{RB}/2 \quad (2.4)$$

In LTE, resources of a PDCCH and a PHICH are mapped to an entire bandwidth used by the user equipment in a distributed manner, but mapping is still based on numbers of the resource blocks in the bandwidth that are numbered in an order of frequency values. A PBCH needs to be mapped to a resource block corresponding to 72 central subcarriers in the bandwidth used by the user equipment. An EPDCCH, a PDSCH, a PMCH are mapped according to numbers 0 to $N_{RB}^{DL}-1$ of the resource blocks in the bandwidth used by the user equipment. In LTE, the channels or signals are all mapped based on numbers of the resource blocks in the bandwidth that are numbered in an order of frequency values.

Resource mapping of a reference signal is related to a resource block. For example, a reference signal sequence is obtained by extending by half a bandwidth in two directions of a high frequency and a low frequency by using a sequence center generated by a sequence generator as a center. Then the sequence is mapped to $N_{RB}^{DL}$ resource blocks. A PSS/SSS is mapped to a resource block corresponding to 72 central subcarriers in the bandwidth used by the user equipment.

In the resource mapping method in the present invention, resource blocks to which the first channel or the first signal is mapped change from resource blocks corresponding to original resource block numbers 0 to $N_{RB}^{DL}-1$ to resource blocks corresponding to resource block numbers 0 to $N_{RB}^{DL}-1$ determined in the present invention, that is, resource blocks corresponding to $\{(0 \sim N_{RB}^{DL}-1)+\text{offset}\} \bmod B_{RB}^{DL}$, where offset represents a resource numbering adjustment value.

In an implementation, the bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth used by the user equipment and the non-overlapping bandwidth in the second bandwidth have a same size.

Step 405: The user equipment receives or sends the first channel or the first signal at the resource mapping location.

In the resource mapping method provided in this embodiment of the present invention, the location indicated by obtained first information is used as the start location or the end location for numbering the resource blocks in the bandwidth used by the user equipment, the resource blocks in the bandwidth used by the user equipment are numbered according to the resource block cyclic shift manner or the resource block consecutive numbering manner, and the first channel or the first signal is mapped to the bandwidth used by the user equipment in the resource block cyclic shift manner according to the numbered resource blocks, so that the user equipment receives or sends the first channel or the first signal at the resource mapping location. In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented, and normal communication between a base station system and the user equipment is ensured.

It should be noted that different first channels and/or different first signals have a same cyclic shift start resource block location for resource mapping; and/or different first channels and/or different first signals have a same cyclic shift end resource block location for resource mapping; and/or different first channels and/or different first signals have a same cyclic shift deviation value for resource mapping.

In the resource block mapping manner in the present invention, resource blocks in an area in which a bandwidth used by first user equipment and a bandwidth used by second user equipment overlap may have a same number. Therefore, when channels of two user equipments are mapped to respective system bandwidths, the channels may be mapped to different resource units, and no conflict occurs, or a first location is adjusted to reduce conflicts.

Further, in another implementation of the present invention, when the bandwidth used by the user equipment overlaps a bandwidth used by other user equipment, a location of a control area of the user equipment in a frequency domain may be configured to be a partial or an entire non-overlapping area in the bandwidth used by the user equipment. A quantity of symbols in the control area in the bandwidth used by the user equipment may be obtained by using higher layer signaling, such as RRC signaling, sent by the base station to the user equipment, may be obtained by the user equipment by reading control channel format information in the bandwidth that is used by the other user equipment and that overlaps the bandwidth used by the user equipment, or may be determined according to a maximum value of the two values of the quantity of symbols obtained by using the higher layer signaling and the control channel format information. By using this configuration method, it may be ensured that the user equipment has an independent and flexible control channel area, and a conflict with a control channel of another user whose bandwidth overlaps the bandwidth of the user equipment is avoided.

It should be noted that the resource block in the present invention may be a physical resource block.

It should be noted that for a method for mapping a resource by the base station, refer to detailed steps of the user equipment. Differently, the base station sends a second signal to the user equipment, and determines the first information according to a start location or an end location of the second signal in the bandwidth used by the user equipment. The start location or the end location of the second signal in the bandwidth used by the user equipment is a start location or an end location of a bandwidth corresponding to a sequence of the second signal. A size of the bandwidth corresponding to the sequence of the second signal is predefined or is notified by the base station or blindly detected. The bandwidth corresponding to the sequence of the second signal is a transmission bandwidth or a carrier bandwidth of the second signal. The base station sends the first information to the user equipment. The base station sends higher layer signaling to the user equipment. The higher layer signaling is used to configure a maximum number of the resource blocks, or the higher layer signaling is used to configure a minimum number of the resource blocks.

Figure 17:
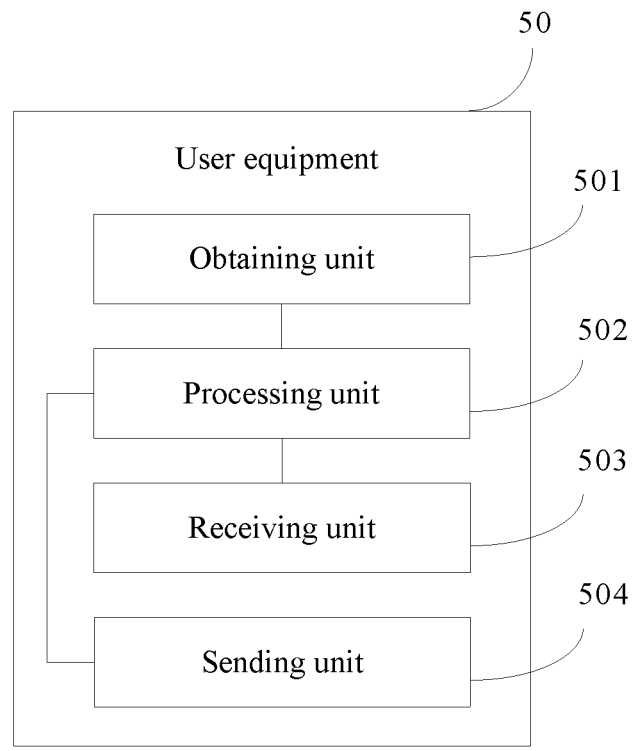
FIG. 17 is a schematic structural diagram of user equipment according to an embodiment of the present invention.

An embodiment of the present invention provides user equipment 50. As shown in FIG. 17, the user equipment 50 includes:

an obtaining unit 501, configured to obtain first information, where the first information is used to indicate a cyclic shift start resource block location or a cyclic shift end resource block location for resource mapping of a first channel or a first signal in a resource block cyclic shift manner in a bandwidth used by the user equipment;

a processing unit 502, configured to determine, according to the resource block cyclic shift manner and the first information, a resource mapping location of the first channel or the first signal in the bandwidth used by the user equipment;

a receiving unit 503, configured to receive the first channel or the first signal at the resource mapping location; and a sending unit 504, configured to send the first channel or the first signal at the resource mapping location.

The resource mapping location of the first channel or the first signal in a bandwidth used by the user equipment is determined according to a resource block cyclic shift manner and the obtained first information, so that the first channel or the first signal is received or sent at the resource mapping location. The first information is used to indicate the cyclic shift start resource block location or the cyclic shift end resource block location for resource mapping of the first channel or the first signal in the resource block cyclic shift manner in the bandwidth used by the user equipment. In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented by using the bandwidth used by the user equipment, and normal communication between a base station system and the user equipment is ensured. Further, the bandwidth used by the user equipment may vary with a capability of the user equipment. In this way, different user equipments may use different bandwidths. Such channel or signal resource mapping designed according to a bandwidth used by a user improves channel or signal transmission flexibility.

The processing unit 502 is specifically configured to:

determine a resource block cyclic shift deviation value according to the first information, and determine, in the resource block cyclic shift manner according to the deviation value, the resource mapping location of the first channel or the first signal in the bandwidth used by the user equipment, where the resource block cyclic shift deviation value is a value of a deviation between the cyclic shift start resource block location for resource mapping corresponding to the first information and a start resource block location in the bandwidth used by the user equipment; or the resource block cyclic shift deviation value is a value of a deviation between the cyclic shift end resource block location for resource mapping corresponding to the first information and an end resource block location in the bandwidth used by the user equipment.

The processing unit 502 is specifically configured to:

determine, according to the cyclic shift start resource block location or the cyclic shift end resource block location indicated by the first information and the resource block cyclic shift deviation value corresponding to the first channel or the first signal, a resource mapping start location or end location of the first channel or the first signal in the bandwidth used by the user equipment; and determine, according to the resource block cyclic shift manner, all resource mapping locations for resource mapping of the first channel or the first signal in the bandwidth used by the user equipment.

The first channel is one or more of a physical control format indicator channel PCFICH, a physical downlink control channel PDCCH, an enhanced physical downlink control channel EPDCCH, a physical hybrid ARQ indicator channel PHICH, a physical broadcast channel PBCH, a physical uplink control channel PUCCH, or a physical random access channel PRACH; and the first signal is one or more of a reference signal, a primary synchronization signal PSS, or a secondary synchronization signal SSS, where the reference signal includes one or more of a cell-specific reference signal CRS, a channel state information-reference signal CSI-RS, a positioning reference signal PRS, a discovery reference signal DRS, or a sounding reference signal SRS.

Different types of first channels and/or different types of first signals have a same cyclic shift start resource block location for resource mapping; and/or different types of first channels and/or different types of first signals have a same cyclic shift end resource block location for resource mapping; and/or different types of first channels and/or different types of first signals have a same cyclic shift deviation value for resource mapping; and/or cyclic shift deviation values or a cyclic shift deviation value for resource mapping of an uplink first channel and/or an uplink first signal are/is different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal are/is different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal are/is different from cyclic shift deviation values or a cyclic shift deviation value for resource mapping of the downlink first channel and/or the downlink first signal.

The obtaining unit 501 is specifically configured to:

blindly detect a second signal, and determine the first information according to a start location or an end location of the second signal in the bandwidth used by the user equipment, where the start location or the end location of the second signal in the bandwidth used by the user equipment is a start location or an end location of a bandwidth corresponding to a sequence of the second signal, a size of the bandwidth corresponding to the sequence of the second signal is predefined or is notified by a base station or blindly detected, and the bandwidth corresponding to the sequence of the second signal is a transmission bandwidth or a carrier bandwidth of the second signal.

The second signal is one or more of a reference signal, a primary synchronization signal PSS, or a secondary synchronization signal SSS, the reference signal includes one or more of a cell-specific reference signal CRS or a CSI-RS, the start location or the end location of the second signal in the bandwidth used by the user equipment includes a boundary at which the bandwidth used by the user equipment overlaps the carrier bandwidth of the second signal, and the second signal is a signal or a channel used to determine the boundary.

The receiving unit 503 is specifically configured to:
receive the first information sent by the base station.

The processing unit 502 is specifically configured to:
a resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

The processing unit 502 is further configured to use, as a start location or an end location for numbering resource blocks in the bandwidth used by the user equipment, the location indicated by the first information, and number, according to the resource block cyclic shift manner or according to a resource block consecutive numbering manner, the resource blocks in the bandwidth used by the user equipment; or the processing unit 502 is further configured to use, as a start location for numbering resource blocks, a start location in the bandwidth used by the user equipment, to consecutively number the resource blocks; or the processing unit 502 is further configured to use, as an end location for numbering resource blocks, an end location in the bandwidth used by the user equipment, to consecutively number the resource blocks.

The processing unit 502 is specifically configured to:
a maximum number of the resource blocks is greater than a quantity of resource blocks included in the bandwidth used by the user equipment; and/or a minimum number of the resource blocks is L, where L is a positive integer greater than or equal to 1.

The maximum number of the resource blocks is configured by higher layer signaling.

The minimum number of the resource blocks is configured by higher layer signaling.

Numbers of the resource blocks of the user equipment are the same as numbers of corresponding resource blocks of a first base station, and the first base station is a base station that communicates with the user equipment.

The bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth used by the user equipment and the non-overlapping bandwidth in the second bandwidth have a same size.

Figure 18:
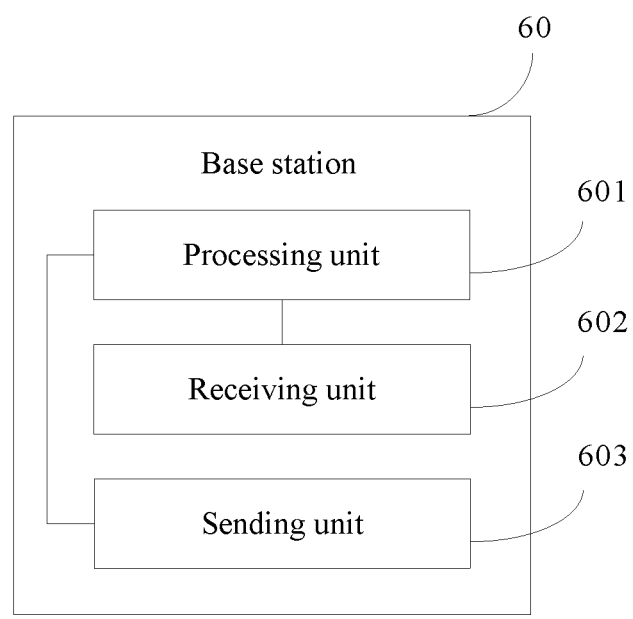
FIG. 18 is a schematic structural diagram of a base station according to an embodiment of the present invention.

An embodiment of the present invention provides a base station 60. As shown in FIG. 18, the base station 60 includes:
a processing unit 601, configured to determine first information, where the first information is used to indicate a cyclic shift start resource block location or a cyclic shift end resource block location for resource mapping of a first channel or a first signal in a resource block cyclic shift manner in a bandwidth used by user equipment, where the processing unit 601 is further configured to determine, according to the resource block cyclic shift manner and the first information, a resource mapping location of the first channel or the first signal in the bandwidth used by the user equipment;

a receiving unit 602, configured to receive the first channel or the first signal at the resource mapping location; and a sending unit 603, configured to send the first channel or the first signal at the resource mapping location.

The resource mapping location of the first channel or the first signal in the bandwidth used by the user equipment is determined according to the resource block cyclic shift manner and the obtained first information, so that the first channel or the first signal is received or sent at the resource mapping location. The first information is used to indicate the cyclic shift start resource block location or the cyclic shift end resource block location for resource mapping of the first channel or the first signal in the resource block cyclic shift manner in the bandwidth used by the user equipment. In the prior art, determining of an available resource and resource mapping are performed in ascending order of frequency domains of all physical resource blocks in a system bandwidth of a base station. By contrast, determining of an available resource and resource mapping of a channel or a signal can be flexibly performed in the resource block cyclic shift manner in the bandwidth used by the user equipment, so that resource mapping of the channel or the signal can be flexibly implemented by using the bandwidth used by the user equipment, and normal communication between a base station system and the user equipment is ensured. Further, the bandwidth used by the user equipment may vary with a capability of the user equipment. In this way, different user equipments may use different bandwidths. Such channel or signal resource mapping designed according to a bandwidth used by a user improves channel or signal transmission flexibility.

The processing unit 601 is specifically configured to:
determine a resource block cyclic shift deviation value according to the first information, and determine, in the resource block cyclic shift manner according to the deviation value, the resource mapping location of the first channel or the first signal in the bandwidth used by the user equipment, where the resource block cyclic shift deviation value is a value of a deviation between the cyclic shift start resource block location for resource mapping corresponding to the first information and a start resource block location in the bandwidth used by the user equipment; or the resource block cyclic shift deviation value is a value of a deviation between the cyclic shift end resource block location for resource mapping corresponding to the first information and an end resource block location in the bandwidth used by the user equipment.

The processing unit 601 is specifically configured to:

determine, according to the cyclic shift start resource block location or the cyclic shift end resource block location indicated by the first information and the resource block cyclic shift deviation value corresponding to the first channel or the first signal, a resource mapping start location or end location of the first channel or the first signal in the bandwidth used by the user equipment; and determine, according to the resource block cyclic shift manner, all resource mapping locations for resource mapping of the first channel or the first signal in the bandwidth used by the user equipment.

The first channel is one or more of a physical control format indicator channel PCFICH, a physical downlink control channel PDCCH, an enhanced physical downlink control channel EPDCCH, a physical hybrid ARQ indicator channel PHICH, a physical broadcast channel PBCH, a physical uplink control channel PUCCH, or a physical random access channel PRACH; and the first signal is one or more of a reference signal, a primary synchronization signal PSS, or a secondary synchronization signal SSS, where the reference signal includes one or more of a cell-specific reference signal CRS, a channel state information-reference signal CSI-RS, a positioning reference signal PRS, a discovery reference signal DRS, or a sounding reference signal SRS.

Different types of first channels and/or different first signals have a same cyclic shift start resource block location for resource mapping; and/or different types of first channels and/or different first signals have a same cyclic shift end resource block location for resource mapping; and/or different types of first channels and/or different first signals have a same cyclic shift deviation value for resource mapping; and/or cyclic shift deviation values or a cyclic shift deviation value for resource mapping of an uplink first channel and/or an uplink first signal are/is different from cyclic shift start resource block locations or a cyclic shift start resource block location for resource mapping of a downlink first channel and/or a downlink first signal; and/or the cyclic shift deviation values or cyclic shift deviation value for resource mapping of the uplink first channel and/or the uplink first signal are/is different from cyclic shift end resource block locations or a cyclic shift end resource block location for resource mapping of the downlink first channel and/or the downlink first signal; and/or the cyclic shift deviation values or cyclic shift deviation value for resource mapping of the uplink first channel and/or the uplink first signal are/is different from cyclic shift deviation values or a cyclic shift deviation value for resource mapping of the downlink first channel and/or the downlink first signal.

The sending unit 603 is further configured to send a second signal, and determine the first information according to a start location or an end location of the second signal in the bandwidth used by the user equipment, where the start location or the end location of the second signal in the bandwidth used by the user equipment is a start location or an end location of a bandwidth corresponding to a sequence of the second signal, a size of the bandwidth corresponding to the sequence of the second signal is predefined or is notified or blindly detected, and the bandwidth corresponding to the sequence of the second signal is a transmission bandwidth or a carrier bandwidth of the second signal.

The second signal is one or more of a reference signal, a primary synchronization signal PSS, or a secondary synchronization signal SSS, the reference signal includes one or more of a cell-specific reference signal CRS or a CSI-RS, the start location or the end location of the second signal in the bandwidth used by the user equipment includes a boundary at which the bandwidth used by the user equipment overlaps the carrier bandwidth of the second signal, and the second signal is a signal or a channel used to determine the boundary.

The sending unit 603 is further configured to send the first information.

The processing unit 601 is specifically configured to:

a resource that may be used for mapping and that is corresponding to the resource block cyclic shift manner includes N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include N lowest-frequency subcarriers and/or M highest-frequency subcarriers in the bandwidth used by the user equipment, where N is an integer greater than or equal to 1, and M is an integer greater than or equal to 1; or a resource that may be used for mapping and that is corresponding to the resource block cyclic shift manner does not include P lowest-frequency resource blocks and/or Q highest-frequency resource blocks in the bandwidth used by the user equipment, where P is an integer greater than or equal to 1, and Q is an integer greater than or equal to 1.

The processing unit 601 is further configured to use, as a start location or an end location for numbering resource blocks in the bandwidth used by the user equipment, the location indicated by the first information, and number, according to the resource block cyclic shift manner or according to a resource block consecutive numbering manner, the resource blocks in the bandwidth used by the user equipment; or the processing unit 601 is further configured to use, as a start location for numbering resource blocks, a start location in the bandwidth used by the user equipment, to consecutively number the resource blocks; or the processing unit 601 is further configured to use, as an end location for numbering resource blocks, an end location in the bandwidth used by the user equipment, to consecutively number the resource blocks.

The processing unit 601 is specifically configured to:

a maximum number of the resource blocks is greater than a quantity of resource blocks included in the bandwidth used by the user equipment; and/or a minimum number of the resource blocks is L, where L is a positive integer greater than or equal to 1.

The sending unit 603 is further configured to:

send higher layer signaling to the user equipment, where the higher layer signaling is used to configure the maximum number of the resource blocks.

The sending unit 603 is further configured to:

send higher layer signaling to the user equipment, where the higher layer signaling is used to configure the minimum number of the resource blocks.

In the bandwidth used by the user equipment, numbers of the resource blocks of the user equipment are the same as numbers of corresponding resource blocks of the base station.

The bandwidth used by the user equipment and a second bandwidth have a same size and overlap in part, a part of the first signal or the first channel mapped to a non-overlapping bandwidth in the bandwidth used by the user equipment is the same as corresponding first signal or corresponding first channel mapped to a non-overlapping bandwidth in the second bandwidth, and the non-overlapping bandwidth in the bandwidth of the user equipment and the non-overlapping bandwidth in the second bandwidth have a same size.

A bandwidth used by the base station includes bandwidths used by at least two user equipments, the bandwidths used by the two user equipments have an overlapping part, and a same resource block for the two user equipments has a same resource block number on the overlapping part; or resource blocks in total bandwidths used by the two user equipments are consecutively numbered; or resource blocks in total bandwidths used by the two user equipments are numbered in a cyclic shift manner, where a maximum number is greater than or equal to a total quantity of the resource blocks in the total bandwidths used by the two user equipments, or/and a minimum number is 0 or 1 or L, where L is a positive integer greater than 1; or a bandwidth used by the base station includes bandwidths used by at least two user equipments, the bandwidths used by the two user equipments have an overlapping part, the base station maps first channels or first signals of the two user equipments to the overlapping part, and parts of the first channels or the first signals of the two user equipments in the overlapping area are the same or different.

It should be noted that user equipment may further include a receiver, a processor, a memory, and a transmitter. For a step performed by the receiver, refer to a specific step of the receiving unit of the user equipment. For a step performed by the transmitter, refer to a specific step of the sending unit of the user equipment. For a step performed by the processor, refer to a specific step of the processing unit of the user equipment. The memory is configured to store a program of the specific processing step of the processor.

A base station may further include a receiver, a processor, a memory, and a transmitter. For a step performed by the transmitter, refer to a specific step of the sending unit of the base station. For a step performed by the processor, refer to a specific step of the processing unit of the base station. The memory is configured to store a program of the specific processing step of the processor. The receiver is configured to receive a message sent by user equipment.

It may be clearly understood by a person skilled in the art that, for the purpose of convenient and brief description, for a detailed working process of the foregoing apparatus and unit, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method performed by user equipment, comprising:
    obtaining first information, wherein the first information is used to indicate a cyclic shift resource block location for resource mapping of a first channel or a first signal in a resource block cyclic shift manner in a bandwidth used by the user equipment, wherein the cyclic shift resource block location is one of a cyclic shift start resource block location or a cyclic shift end resource block location;
    determining, according to the resource block cyclic shift manner, the first information and a total quantity of resource blocks in the bandwidth used by the user equipment, a resource mapping location of the first channel or the first signal in the bandwidth used by the user equipment; and
    receiving or sending the first channel or the first signal at the resource mapping location.

2. The method according to claim 1, wherein the determining, according to the resource block cyclic shift manner and the first information, the resource mapping location of the first channel or the first signal in the bandwidth used by the user equipment comprises:
    determining a resource block cyclic shift deviation value according to the first information; and
    determining, in the resource block cyclic shift manner according to the deviation value, the resource mapping location of the first channel or the first signal in the bandwidth used by the user equipment, wherein
    the resource block cyclic shift deviation value is:
        a value of a deviation between the cyclic shift start resource block location for resource mapping corresponding to the first information and a start resource block location in the bandwidth used by the user equipment; or
        a value of a deviation between the cyclic shift end resource block location for resource mapping corresponding to the first information and an end resource block location in the bandwidth used by the user equipment.

3. The method according to claim 2, wherein the determining, according to the resource block cyclic shift manner and the first information, the resource mapping location of the first channel or the first signal in the bandwidth used by the user equipment further comprises:
- determining, according to the cyclic shift resource block location indicated by the first information and the resource block cyclic shift deviation value corresponding to the first channel or the first signal, a resource mapping start location when the cyclic shift resource block location is the cyclic shift start resource block location or a resource mapping end location when the cyclic shift resource block location is the cyclic shift end resource block location of the first channel or the first signal in the bandwidth used by the user equipment; and
- determining, according to the resource block cyclic shift manner, all resource mapping locations for resource mapping of the first channel or the first signal in the bandwidth used by the user equipment.

4. The method according to claim 1, wherein:
- the first channel is one or more of a physical control format indicator channel (PCFICH), a physical downlink control channel (PDCCH), an enhanced physical downlink control channel (EPDCCH), a physical hybrid ARQ indicator channel (PHICH), a physical broadcast channel (PBCH), a physical uplink control channel (PUCCH), or a physical random access channel (PRACH); and
- the first signal is one or more of a reference signal, a primary synchronization signal (PSS), or a secondary synchronization signal (SSS), wherein the reference signal comprises one or more of a cell-specific reference signal (CRS), a channel state information-reference signal (CSI-RS), a positioning reference signal (PRS), a discovery reference signal (DRS), or a sounding reference signal (SRS).

5. The method according to claim 1, wherein:
- at least one of: different types of first channels have a same cyclic shift start resource block location for resource mapping, and different types of first signals have a same cyclic shift start resource block location for resource mapping; or
- at least one of: different types of first channels have a same cyclic shift end resource block location for resource mapping, and different types of first signals have a same cyclic shift end resource block location for resource mapping; or
- at least one of: different types of first channels have a same cyclic shift end resource block location for resource mapping, and different types of first signals have a same cyclic shift deviation value for resource mapping; or
- cyclic shift deviation values or a cyclic shift deviation value for resource mapping of at least one of an uplink first channel and an uplink first signal is different from cyclic shift start resource block locations or a cyclic shift start resource block location for resource mapping of at least one of a downlink first channel and a downlink first signal; or
- the cyclic shift deviation values or cyclic shift deviation value for resource mapping of at least one of the uplink first channel and the uplink first signal is different from cyclic shift end resource block locations or a cyclic shift end resource block location for resource mapping of the downlink first channel and the downlink first signal; or
- the cyclic shift deviation values or cyclic shift deviation value for resource mapping of the uplink first channel and the uplink first signal is different from cyclic shift deviation values or a cyclic shift deviation value for resource mapping of the downlink first channel and the downlink first signal.

6. The method according to claim 1, wherein the obtaining first information comprises:
- blindly detecting a second signal; and
- determining the first information according to a start location or an end location of the second signal in the bandwidth used by the user equipment, wherein the start location or the end location of the second signal in the bandwidth used by the user equipment comprises a start location or an end location of a bandwidth corresponding to a sequence of the second signal, wherein a size of the bandwidth corresponding to the sequence of the second signal is predefined or is notified by a base station or blindly detected, and wherein the bandwidth corresponding to the sequence of the second signal is a transmission bandwidth or a carrier bandwidth of the second signal.

7. The method according to claim 6, wherein the second signal is one or more of a reference signal, a primary synchronization signal (PSS), or a secondary synchronization signal (SSS), wherein the reference signal comprises one or more of a cell-specific reference signal (CRS) or a channel state information-reference signal (CSI-RS), wherein the start location or the end location of the second signal in the bandwidth used by the user equipment comprises a boundary at which the bandwidth used by the user equipment overlaps the carrier bandwidth of the second signal, and wherein the second signal is a signal or a channel used to determine the boundary.

8. The method according to claim 1, wherein the bandwidth used by the user equipment and a second bandwidth have a same size and overlap in part, wherein a part of the first signal or the first channel mapped to a non-overlapping bandwidth in the bandwidth used by the user equipment is the same as corresponding first signal or corresponding first channel mapped to a non-overlapping bandwidth in the second bandwidth, and wherein the non-overlapping bandwidth in the bandwidth used by the user equipment and the non-overlapping bandwidth in the second bandwidth have a same size.

9. An apparatus, comprising:
- at least one processor; and
- a non-transitory computer-readable storage medium coupled to the at least one processor and storing programming instructions for execution by the at least one processor, wherein the programming instructions instruct the at least one processor to perform operations comprising:
  - obtaining first information, wherein the first information is used to indicate a cyclic shift resource block location for resource mapping of a first channel or a first signal in a resource block cyclic shift manner in a bandwidth used by user equipment, wherein the cyclic shift resource block location is one of a cyclic shift start resource block location or a cyclic shift end resource block location;
  - determining, according to the resource block cyclic shift manner, the first information and a total quantity of resource blocks in the bandwidth used by the user equipment, a resource mapping location of the first channel or the first signal in the bandwidth used by the user equipment; and receiving or sending the first channel or the first signal at the resource mapping location.

10. The apparatus according to claim 9, wherein the program makes a computer execute steps of determining a resource mapping location further comprises:
determining a resource block cyclic shift deviation value according to the first information; and
determining, in the resource block cyclic shift manner according to the deviation value, the resource mapping location of the first channel or the first signal in the bandwidth used by the user equipment, wherein
the resource block cyclic shift deviation value is at least one of:
a value of a deviation between the cyclic shift start resource block location for resource mapping corresponding to the first information and a start resource block location in the bandwidth used by the user equipment; or
a value of a deviation between the cyclic shift end resource block location for resource mapping corresponding to the first information and an end resource block location in the bandwidth used by the user equipment.

11. The apparatus according to claim 10, wherein determining a resource mapping location further comprises:
determining, according to the cyclic shift resource block location indicated by the first information and the resource block cyclic shift deviation value corresponding to the first channel or the first signal, a resource mapping start location when the cyclic shift resource block location is the cyclic shift start resource block location or a resource mapping end location when the cyclic shift resource block location is the cyclic shift end resource block location of the first channel or the first signal in the bandwidth used by the user equipment; and
determining, according to the resource block cyclic shift manner, all resource mapping locations for resource mapping of the first channel or the first signal in the bandwidth used by the user equipment.

12. The apparatus according to claim 9, wherein the first channel is one or more of a physical control format indicator channel (PCFICH), a physical downlink control channel (PDCCH), an enhanced physical downlink control channel (EPDCCH), a physical hybrid ARQ indicator channel (PHICH), a physical broadcast channel (PBCH), a physical uplink control channel (PUCCH), or a physical random access channel (PRACH); and
the first signal is one or more of a reference signal, a primary synchronization signal PSS, or a secondary synchronization signal (SSS), wherein the reference signal comprises one or more of a cell-specific reference signal (CRS), a channel state information-reference signal (CSI-RS), a positioning reference signal (PRS), a discovery reference signal (DRS), or a sounding reference signal (SRS).

13. The apparatus according to claim 9, wherein:
at least one of: different types of first channels have a same cyclic shift start resource block location for resource mapping, and different types of first signals have a same cyclic shift start resource block location for resource mapping; or
at least one of: different types of first channels have a same cyclic shift end resource block location for resource mapping, and different types of first signals have a same cyclic shift end resource block location for resource mapping; or at least one of: different types of first channels have a same cyclic shift end resource block location for resource mapping, and different types of first signals have a same cyclic shift deviation value for resource mapping; or
cyclic shift deviation values or a cyclic shift deviation value for resource mapping of at least one of an uplink first channel and an uplink first signal is different from cyclic shift start resource block locations or a cyclic shift start resource block location for resource mapping of at least one of a downlink first channel and a downlink first signal; or
the cyclic shift deviation values or cyclic shift deviation value for resource mapping of at least one of the uplink first channel and the uplink first signal is different from cyclic shift end resource block locations or a cyclic shift end resource block location for resource mapping of the downlink first channel and the downlink first signal; or
the cyclic shift deviation values or cyclic shift deviation value for resource mapping of the uplink first channel and the uplink first signal is different from cyclic shift deviation values or a cyclic shift deviation value for resource mapping of the downlink first channel and the downlink first signal.

14. The apparatus according to claim 9, wherein obtaining first information comprises:
blindly detecting a second signal; and
determining the first information according to a start location or an end location of the second signal in the bandwidth used by the user equipment, wherein the start location or the end location of the second signal in the bandwidth used by the user equipment comprises a start location or an end location of a bandwidth corresponding to a sequence of the second signal, wherein a size of the bandwidth corresponding to the sequence of the second signal is predefined or is notified by a base station or blindly detected, and wherein the bandwidth corresponding to the sequence of the second signal is a transmission bandwidth or a carrier bandwidth of the second signal.

15. The apparatus according to claim 14, wherein the second signal is one or more of a reference signal, a primary synchronization signal (PSS), or a secondary synchronization signal (SSS), wherein the reference signal comprises one or more of a cell-specific reference signal (CRS) or a channel state information-reference signal (CSI-RS), wherein the start location or the end location of the second signal in the bandwidth used by the user equipment comprises a boundary at which the bandwidth used by the user equipment overlaps the carrier bandwidth of the second signal, and wherein the second signal is a signal or a channel used to determine the boundary.

16. The apparatus according to claim 9, wherein the bandwidth used by the user equipment and a second bandwidth have a same size and overlap in part, wherein a part of the first signal or the first channel mapped to a non-overlapping bandwidth in the bandwidth used by the user equipment is the same as corresponding first signal or corresponding first channel mapped to a non-overlapping bandwidth in the second bandwidth, and wherein the non-overlapping bandwidth in the bandwidth used by the user equipment and the non-overlapping bandwidth in the second bandwidth have a same size.

17. A non-transitory computer-readable storage medium comprising instructions which, when executed by a computer, cause the computer to carry out steps of:

obtaining first information, wherein the first information is used to indicate a cyclic shift resource block location for resource mapping of a first channel or a first signal in a resource block cyclic shift manner in a bandwidth used by a user equipment, wherein the cyclic shift resource block location is one of a cyclic shift start resource block location or a cyclic shift end resource block location;

determining, according to the resource block cyclic shift manner, the first information and a total quantity of resource blocks in the bandwidth used by the user equipment, a resource mapping location of the first channel or the first signal in the bandwidth used by the user equipment; and receiving or sending the first channel or the first signal at the resource mapping location.

18. The non-transitory computer-readable storage medium according to claim 17, wherein determining a resource mapping location further comprises:

determining a resource block cyclic shift deviation value according to the first information; and determining, in the resource block cyclic shift manner according to the deviation value, the resource mapping location of the first channel or the first signal in the bandwidth used by the user equipment, wherein the resource block cyclic shift deviation value is at least one of:
a value of a deviation between the cyclic shift start resource block location for resource mapping corresponding to the first information and a start resource block location in the bandwidth used by the user equipment; or
a value of a deviation between the cyclic shift end resource block location for resource mapping corresponding to the first information and an end resource block location in the bandwidth used by the user equipment.

19. The non-transitory computer-readable storage medium according to claim 18, wherein determining the resource mapping location further comprises:

determining, according to the cyclic shift resource block location indicated by the first information and the resource block cyclic shift deviation value corresponding to the first channel or the first signal, a resource mapping start location when the cyclic shift resource block location is the cyclic shift start resource block location or a resource mapping end location when the cyclic shift resource block location is the cyclic shift end resource block location of the first channel or the first signal in the bandwidth used by the user equipment; and determining, according to the resource block cyclic shift manner, all resource mapping locations for resource mapping of the first channel or the first signal in the bandwidth used by the user equipment.

20. The non-transitory computer-readable storage medium according to claim 17, wherein the first channel is one or more of a physical control format indicator channel (PCFICH), a physical downlink control channel (PDCCH), an enhanced physical downlink control channel (EPDCCH), a physical hybrid ARQ indicator channel (PHICH), a physical broadcast channel (PBCH), a physical uplink control channel (PUCCH), or a physical random access channel (PRACH); and the first signal is one or more of a reference signal, a primary synchronization signal (PSS), or a secondary synchronization signal (SSS), wherein the reference signal comprises one or more of a cell-specific reference signal (CRS), a channel state information-reference signal (CSI-RS), a positioning reference signal (PRS), a discovery reference signal (DRS), or a sounding reference signal (SRS).

21. The non-transitory computer-readable storage medium according to claim 17, wherein the bandwidth used by the user equipment and a second bandwidth have a same size and overlap in part, wherein a part of the first signal or the first channel mapped to a non-overlapping bandwidth in the bandwidth used by the user equipment is the same as corresponding first signal or corresponding first channel mapped to a non-overlapping bandwidth in the second bandwidth, and wherein the non-overlapping bandwidth in the bandwidth used by the user equipment and the non-overlapping bandwidth in the second bandwidth have a same size.

* * * * *